United States Patent [19]
Herbert et al.

[11] Patent Number: 5,709,765
[45] Date of Patent: Jan. 20, 1998

[54] FLEXIBLE BELT SYSTEM

[75] Inventors: William G. Herbert, Williamson; Robert C.U. Yu, Webster; Geoffrey M.T. Foley, Fairport; William W. Limburg; Richard L. Post, both of Penfield; Donald C. VonHoene, Fairport; Satchidanand Mishra, Webster, all of N.Y.

[73] Assignee: Xerox Corporation, Stamford, Conn.

[21] Appl. No.: 334,010

[22] Filed: Oct. 31, 1994

[51] Int. Cl.⁶ ................................................ G03G 15/02
[52] U.S. Cl. ........................... 156/293; 156/294; 29/235
[58] Field of Search ...................... 436/58, 69; 355/213; 198/845; 156/293, 294; 29/235

[56] References Cited

U.S. PATENT DOCUMENTS

| | | | |
|---|---|---|---|
| 3,695,757 | 10/1972 | Gregory | 355/3 |
| 3,797,889 | 3/1974 | Wilkinson | 302/2 R |
| 3,846,901 | 11/1974 | Lovett | 29/450 |
| 3,930,684 | 1/1976 | Lasch, Jr. et al. | 302/2 R |
| 4,344,700 | 8/1982 | Kasama et al. | 355/3 SC |
| 4,532,166 | 7/1985 | Thomsen et al. | 428/57 |
| 4,711,833 | 12/1987 | McAneney et al. | 430/131 |
| 4,747,992 | 5/1988 | Sypula et al. | 264/130 |
| 5,039,598 | 8/1991 | Abramsohn et al. | 430/347 |
| 5,073,434 | 12/1991 | Frank et al. | 428/195 |
| 5,083,657 | 1/1992 | Kelsey | 198/811 |
| 5,100,628 | 3/1992 | Griffiths et al. | 427/121 |
| 5,143,573 | 9/1992 | Ammon et al. | 156/294 |
| 5,308,725 | 5/1994 | Yu et al. | 430/56 |

FOREIGN PATENT DOCUMENTS

| | | |
|---|---|---|
| 0003051 | 7/1979 | European Pat. Off. |
| 0246627 | 11/1987 | European Pat. Off. |

Primary Examiner—Richard Weisberger

[57] ABSTRACT

A flexible belt is disclosed which includes a major segment and at least one narrow minor segment, the narrow minor segment extending from one end of the belt to the opposite end and being more extendible than the major segment when subjected to an externally applied tension. This belt may be a component of a composite cylindrical device including a rigid drum substrate supporting the flexible belt in a stretched condition. The composite cylindrical device may be fabricated by providing a preformed rigid cylindrical support drum having a predetermined outer circumference, a first end and a second end, providing a flexible belt having an outer surface and an inner surface circumference of at least about 0.05 percent smaller than the outer circumference of the support drum, the belt including a major segment and at least one narrow minor segment, the narrow minor segment extending from one end of the belt to the opposite end and being more extendible than the major segment under the same applied tension, circumferentially expanding the belt with a flowing fluid under pressure until the inner surface circumference of the belt adjacent the first end is stretched to a new dimension of at least about 0.1 percent greater than the outer circumference of the support drum while maintaining the belt below the elastic limit of the belt, sliding the belt onto the support drum from the first end toward the second end of the support drum until substantially all of the belt encircles the outer surface of the support drum, and terminating the flow of the flowing liquid to allow the belt to contract onto the outer surface of the support drum.

20 Claims, 14 Drawing Sheets

FIG. 12
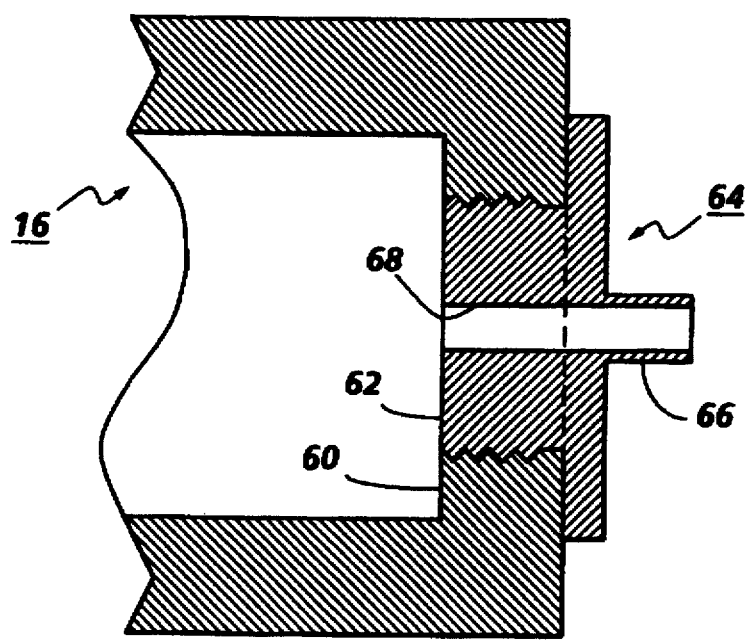
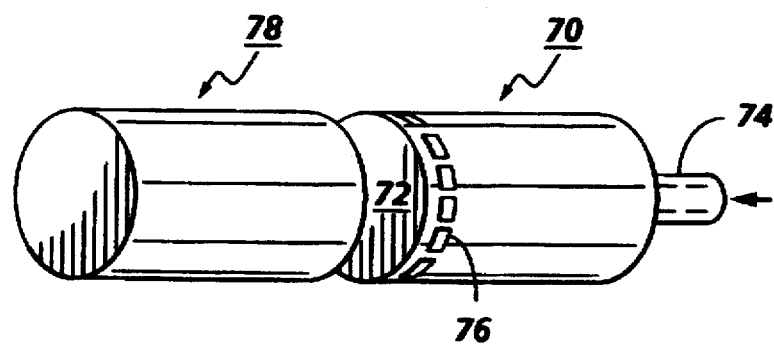
FIG. 13

FIG. 14
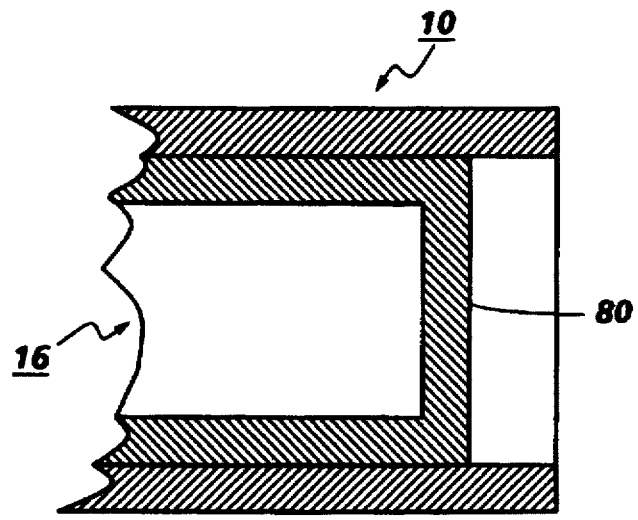
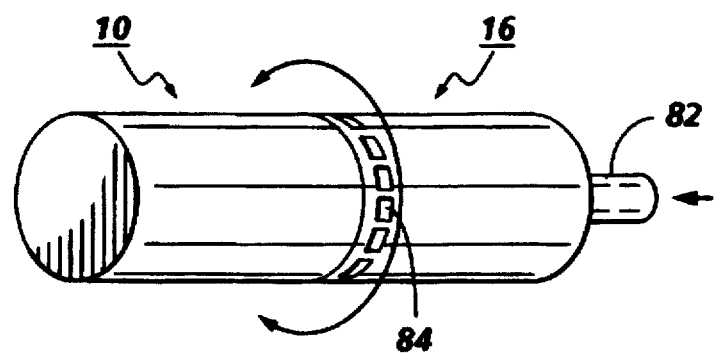
FIG. 15

FIG. 16A
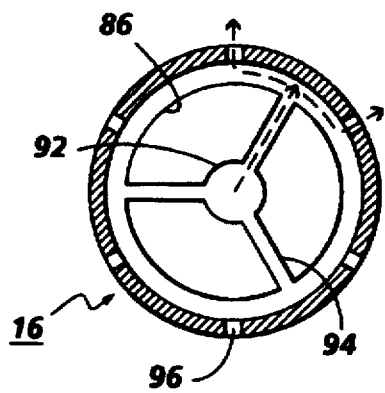
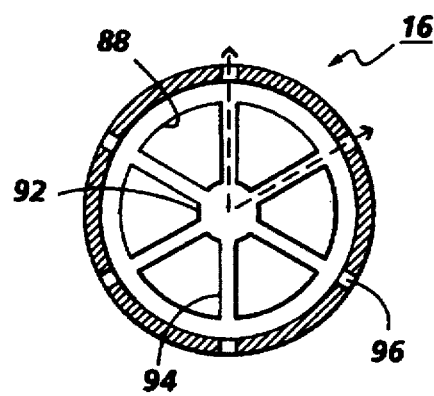
FIG. 16B
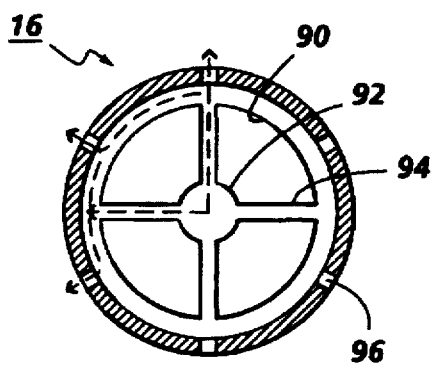
FIG. 16C

FIG. 17
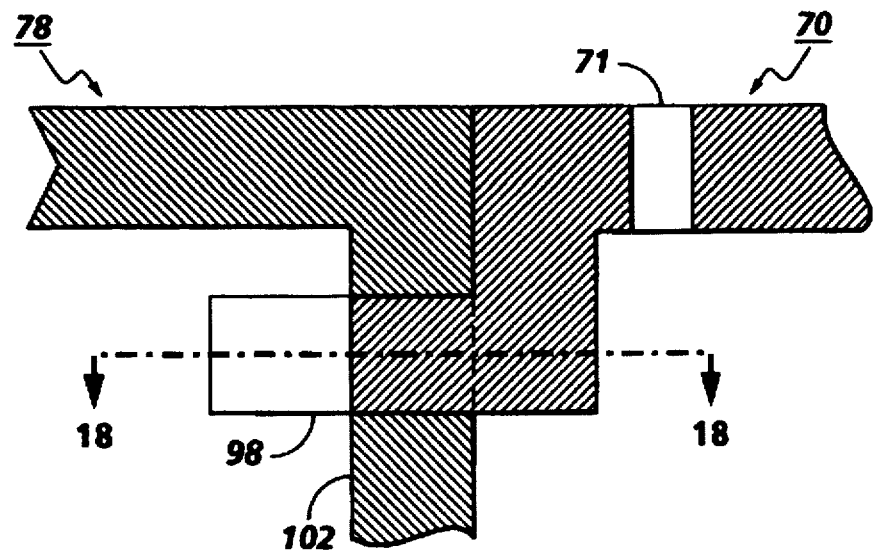
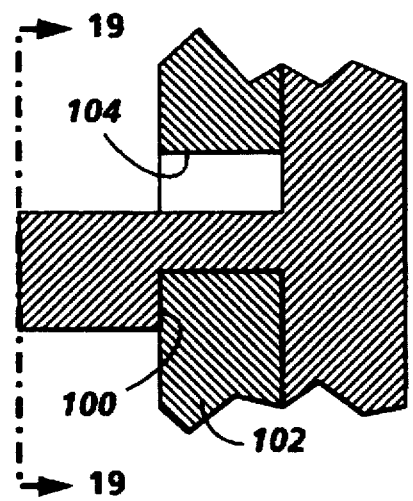
FIG. 18

FIG. 22
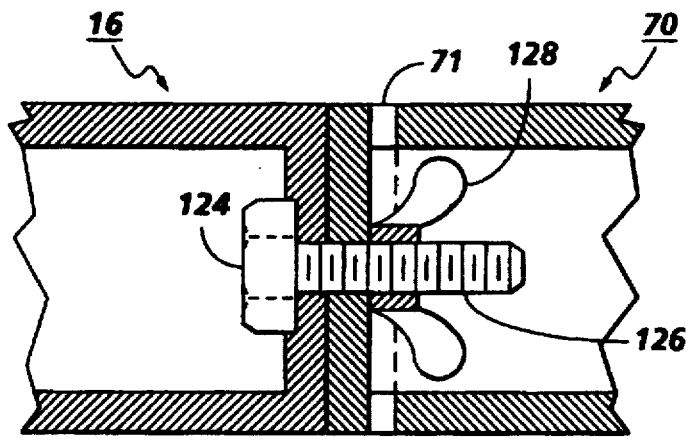
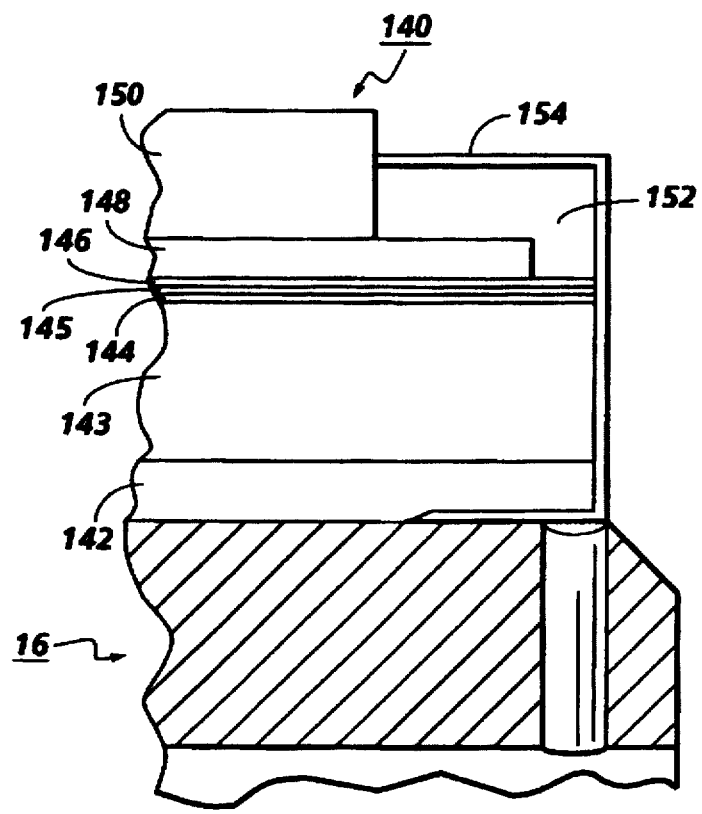
FIG. 23

FIG. 24
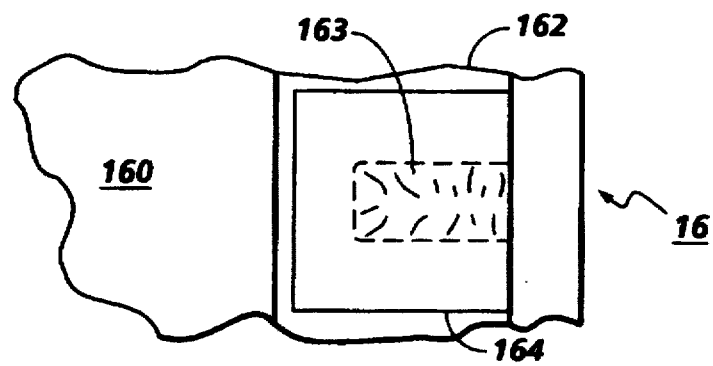
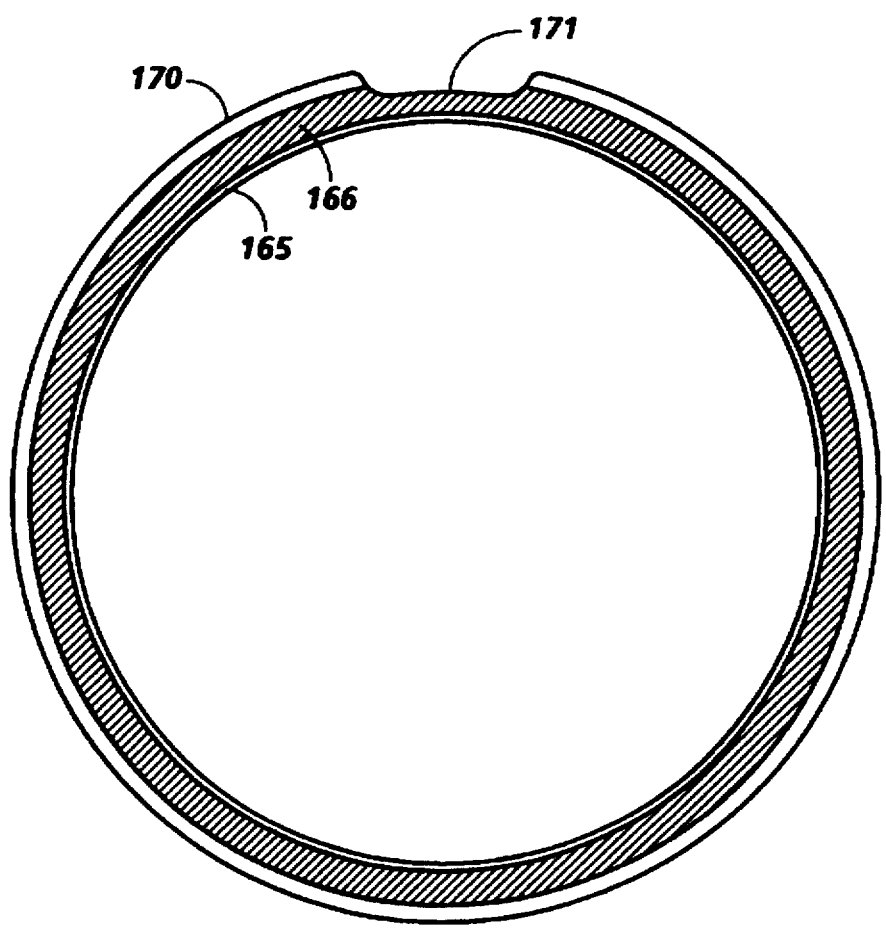
FIG. 25

FIG. 29
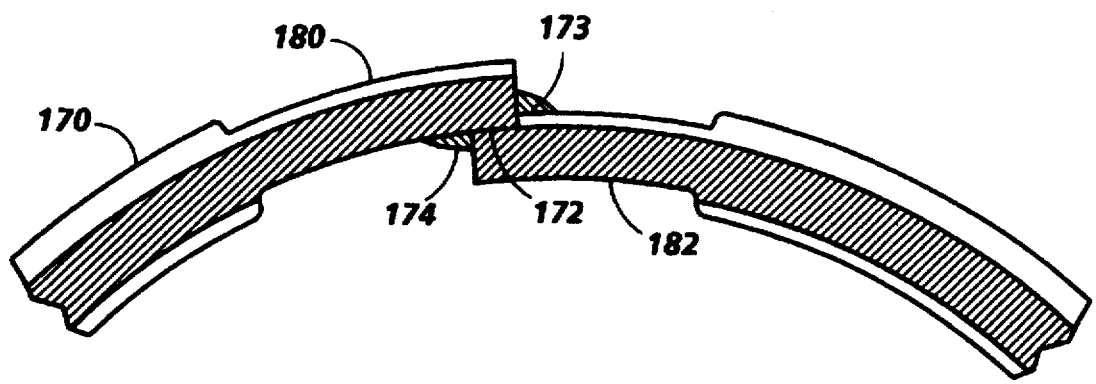
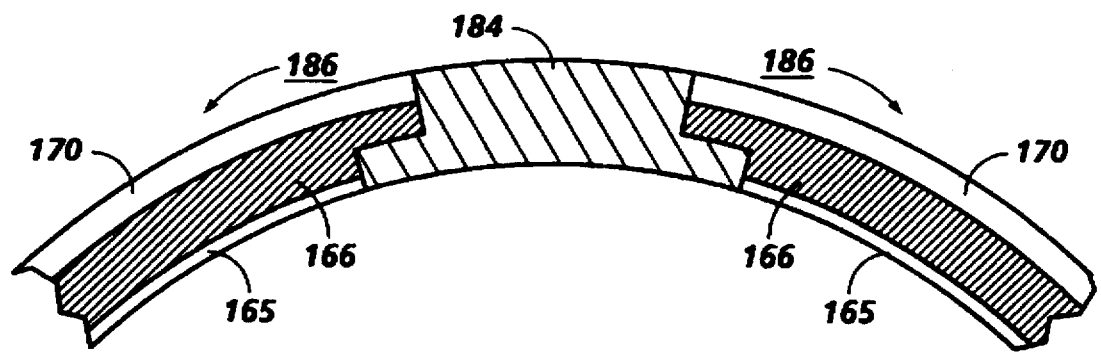
FIG. 30

FLEXIBLE BELT SYSTEM

BACKGROUND OF THE INVENTION

This invention relates in general to methods of fabricating cylindrical devices comprising a flexible tube or belt supported on a rigid cylindrical support member and the product of such method. The flexible belt has a segment with a thin cross-sectional area to facilitate mounting over the rigid cylindrical support member.

Coated cylinders are employed extensively in various arts. For example coated cylinders may be utilized as electrostatographic imaging members, drive rolls, calendaring rolls, fuser rolls, transport rolls, and the like. Similarly, flexible tubes or belts are commonly utilized for numerous purposes such as electrostatographic imaging members, conveyor belts, drive belts and the like.

Typical electrostatographic flexible imaging members include, for example, photoreceptors for electrophotographic imaging systems, and electroreceptors or ionographic imaging members for electrographic imaging systems. Both electrophotographic and ionographic imaging members are commonly utilized in either a belt or a drum configuration. These electrostatographic imaging member belts may be seamless or seamed. For electrophotographic applications, the imaging members preferably have a belt configuration. These belts often comprise a flexible supporting substrate coated with one or more layers of photoconductive material. The substrates may be inorganic such as electroformed nickel or organic such as a film forming polymer. The photoconductive coatings applied to these belts may be inorganic such as selenium or selenium alloys or organic. The organic photoconductive layers may comprise, for example, single binder layers in which photoconductive particles are dispersed in a film forming binder or multilayers comprising, for example, a charge generating layer and a charge transport layer.

Electrophotographic imaging members having a belt configuration are normally entrained around and supported by at least two rollers. Generally, one of the rollers is driven by a motor to transport the belt around the rollers during electrophotographic imaging cycles. Since electrophotographic imaging belts, particularly welded seam belts, are not perfectly cylindrical and, more specifically, tend to be slightly cone shaped, these flexible belts tend to "walk" axially along the support rollers. Belt walking causes one edge of the belt to strike one or more edge guides positioned adjacent the ends of the rollers to limit axial movement. Friction and force interaction occurring between the edge guide and the edge of the photoreceptor belt can cause the belt to wear, rip, buckle and otherwise damage the belt.

Belts driven around supporting rollers can slip relative to the surface of the roller during stop and go operations. Belt slipping has been a serious problem when the surface contact friction between the backside of the imaging belt and the elastomeric outer surface of the drive roll is substantially reduced as a result of aging of the elastomeric material or deposition and accumulation of undesirable foreign material on the surface of the drive roll. This slippage can adversely affect registration of images, particularly where multiple, sequentially formed and transferred images must be precisely registered with each other in demanding applications such as color imaging. Further, where welded belt seams encounter slippage, sophisticated detection systems are required to ensure that images are not formed on the seam when the seam shifts due to slippage. Also, there are other serious drawbacks in terms of belt tracking and problems with good image registration. Welded belts, because of the difficulties associated with perfectly aligning overlapping ends during seam welding, are not as concentric as desired.

Often, the supporting rollers for an electrophotographic imaging belt have relatively small diameters. Constant flexing of the belt around small diameter support rollers can cause the seam to crack. The cracks propagate and cause belt delamination because of the flexing as well as fatigue. In addition to these seam cracking and delamination problems, dynamic flexing of the belt around the small diameter support rollers also causes cracking of the outer imaging layer. Cracking of the outer imaging layer leads to copy print defects.

The region of a belt located between supporting rollers can vibrate and undesirably alter the often critical distances between the belt imaging surface and devices such as optical exposure means, charging corotrons, development applicators, transfer stations and the like.

In addition, the anti-curl back coating on a belt tends to wear during cycling and such wear reduces the effectiveness of the anti-curl back coating from preventing curling of the edges of the belt. Curling of the belt also adversely affects the critical distances between the belt imaging surface and adjacent processing stations.

Another type of electrophotographic imaging member that is well known in the art is the drum type photoreceptor. Some drum type photoreceptors are coated with one or more coatings. Coatings may be applied by well known techniques such as dip coating or spray coating. Dip coating of drums usually involves immersing of a cylindrical drum while the axis of the drum is maintained in a vertical alignment during the entire coating and subsequent drying operation. Because of the vertical alignment of the drum axis during the coating operation, the applied coatings tend to be thicker at the lower end of the drum relative to the upper end of the drum due to the influence of gravity on the flow of the coating material. Coatings applied by spray coating can also be uneven, e.g., orange peel effect. Coatings that have an uneven thickness do not have uniform electrical properties at different locations of the coating. Also, the coating of drums in a batch operation is time consuming and costly. In addition, the many handling steps required for batch drum coating tend to increase the likelihood that one or more coatings will be damaged or contaminated. Moreover, dip or spray coated photoreceptor drums are more costly to manufacture and do not exhibit the superior electrophotographic characteristics of flexible electrostatographic imaging belts. Moreover, the coatings are difficult to remove without damaging the underlying drum during reclaiming operations thereby increasing the likelihood of rendering the drum unsuitable for recycling.

Similar difficulties have been experienced with fabrication of other types of coated drums such as coated fuser rolls and sheet transport rolls.

INFORMATION DISCLOSURE STATEMENT

U.S. Pat. No. 5,308,725 issued to Yu et al. on May 3, 1994—A process is disclosed which includes providing at least two support members maintained at a predetermined distance from each other, encircling the support members with at least one loosely hanging preformed flexible seamless carrier support sleeve having a predetermined outer circumference, encircling the seamless carrier support sleeve with a flexible belt having an inner circumference substantially same as or less than the predetermined outer circumference of the seamless carrier support sleeve, and increasing the distance between the support members to stretch the flexible belt, the size of the inner circumference of the stretched flexible belt being substantially equal to the outer circumference of the seamless carrier support sleeve after stretching the flexible belt. The resulting flexible belt assembly fabricated by this process may be utilized in various systems including electrostatographic imaging systems.

U.S. Pat. No. 4,532,166 to Thomsen et al. issued Jul. 30, 1985—A welded web is disclosed comprising a first edge of a web having at least one aperture overlapping a second edge of a web comprising thermoplastic material on an exposed surface along the second edge to form a region of contiguous contact between the first edge and the second edge, at least a portion of the thermoplastic material at least partially filling the aperture thereby bonding the first edge to the second edge. The web may be formed by a process comprising providing a web having a first edge, providing a web having a second edge, forming at least one aperture in at least the first edge, overlapping the first edge over the thermoplastic material on the exposed surface along the second edge whereby the thermoplastic material on the second edge at least covers the aperture to form a region of contiguous contact between the first edge and the second edge, raising the temperature at least in the region of contiguous contact adjacent the aperture whereby thermoplastic material from the second edge at least partially fills the aperture thereby bonding the first edge to the second edge.

U.S. Pat. No. 5,143,573 issued to Ammon et al on Sep. 1, 1992 (European equivalent 0 406 172 A2, published Jan. 2, 1991)—A device and method are disclosed for applying a flexible layer to rollers, as used in graphics machines, such as printing presses or coating machines, whose roller bodies consist of a carrying tube. A tubular, flexible body is provided which is pushed over a support tube that is axially connected to a transition piece and a carrying tube. In the area of the transition piece, compressed air is admitted and is discharged at a discharge force, to generate an air cushion between the tubular, flexible body and the carrying tube, over which the tubular, flexible body is pushed. When the compressed air supply is disconnected, the tubular, flexible body is permanently held to the carrying tube by a previously applied adhesive layer on the carrying tube.

U.S. Pat. No. 4,711,833 issued to T. McAneney et al. on Dec. 8, 1987—A process is disclosed for fabricating seamless belts comprising providing a mandrel coated with a release coating, depositing a polymer by electrostatic spraying, melting the polymer and cooling the polymer. The resulting seamless belt is removed from the mandrel prior to or after application of a ground plane layer, photogenerating layer and charge generating layer. After formation of the coated or uncoated belt, air pressure is applied to the interior of the mandrel. The air passes through holes at one end of the mandrel to lift and break the adhesive bond between the inside surface of the seamless coated or uncoated belt and the mandrel surface. The air pressure is then released and the seamless coated or uncoated belt is easily slipped off the mandrel.

U.S. Pat. No. 4,747,992 issued to D. Sypula et al on May 31, 1988—A process is disclosed for forming a seamless belt comprising forming at least one thin uniform fluid coating of a film forming polymer on a cylindrical mandrel having a larger mass, lower thermal conductivity or larger mass and lower thermal conductivity than the film forming polymer and a critical surface tension greater than the surface tension of the fluid coating to form at least one thin coating around the mandrel, heating both the mandrel and the coating to a temperature above the apparent $T_g$ of the solid coating to expand the coating and mandrel, cooling the coating below the apparent $T_g$ of the solid coating prior to substantial cooling of the mandrel, cooling the mandrel whereby the mandrel contracts at a greater rate than the coating until separation occurs between the mandrel, and removing the coating from the mandrel. A fluid of air or liquid may be introduced at one or both ends of the mandrel between the mandrel surface and the deposited belt to reduce adhesion between the mandrel and the coating prior to removing the coating from the mandrel.

U.S. Pat. No. 5,039,598 issued to Abramsohn et al. on Aug. 13, 1991—A process is disclosed for preparing ionographic imaging members including providing a flexible-shrinkable tube containing a dielectric film-forming polymer having a certain $T_g$, charge decade and elastic memory properties, providing a cylindrical support member having an outer diameter that is less than the inner diameter of the flexible tube, applying a continuous coating of the interior of the tube or the exterior the cylindrical support member, the coating comprising an electrically conductive material, an adhesive material or mixture thereof, shrinking the tube to bring the inner surface of the tube and the outer surface of the cylindrical support member into intimate physical contact with the continuous coating. The tube may be worked to expand the diameter so that it will fit over a cylindrical metal or conductive roll substrate. For example, one may inflate an elastomeric tube with the pressurized fluid by sealing one end of the tube and introducing the pressurized fluid into the interior of the tube through the other end. For example, one may seal the end of the tube by inserting a tapered stopper, or by pinching or heat sealing the end and later trimming the end to fix the substrate. The cylindrical support member can thereafter be inserted within the flexible tube while the tube is in the inflated state. Subsequent removal of the pressurized fluid allows the tube to shrink around the cylindrical support member.

U.S. Pat. No. 5,073,434 issued to J. Frank et al. on Dec. 17, 1991—An ionographic imaging member is disclosed containing a conductive layer and a uniform continuous dielectric imaging layer, the imaging layer having a certain dielectric constant, thickness relationship.

U.S. Pat. No. 5,100,628 issued to C. Griffiths et al. on Mar. 21, 1992—A method and apparatus for coating photoreceptors using copying machines is disclosed in which, prior to coating, an elastically deformable material is placed around the external surface of mandrel to accommodate a belt. The thickness of the material is such that when the belt is pushed over the mandrel the deformable material is deformed and engages the interior surfaces of the belt facing the mandrel. As a result of heating and cooling steps involved during the coating process the belt contracts and expands differently than the mandrel. After coating, the coated belt is removed from the mandrel.

U.S. Pat. No. 4,344,700 issued to Kasama et al. on Aug. 17, 1982 (German equivalent 29 49 164, published Jun. 26, 1980)—A mechanism is disc disclosed for mounting and dismounting a screen-like photosensitive medium having a number of fine openings with respect to an apparatus body. It is known to form a screen-like photosensitive medium into the shape of a drum, but according to the present invention, the photosensitive medium and a gear for driving the photosensitive medium are constructed independently of each other to leave the gear on the apparatus body side, and a device for directing a current applied to the photosensitive medium side is provided inside of the gear with a sliding member interposed therebetween. The side surface of the photosensitive medium which corresponds to the gear is provided with a construction similar to the gear portion, thereby facilitating the mounting and dismounting of the screen-like photosensitive medium with respect to the apparatus body.

U.S. Pat. No. 3,695,757 issued to Gregory on Oct. 3, 1972—A xerographic plate including a mandrel and a photoconductive sleeve mounted thereon is disclosed. The mandrel has an inflatable tube mounted in a groove for securing the sleeve to the mandrel.

U.S. Pat. No. 3,797,889 issued to Wilkinson on Mar. 19, 1974—A workpiece alignment system is disclosed which is particularly useful in the alignment of circular or cylindrical workpieces. The workpieces are provided with a flat edge along the circumference which flat edge is aligned in a preselected direction, thereby aligning the workpiece. The system is comprised of a body which includes apertures through which directional air jets flow carrying the workpiece on a directional air cushion to position the workpiece on the body; rotational air jet apertures for rotating the positioned workpiece until the flat edge is in the preselected direction; and flat sensing vacuum apertures for stopping the rotation of the workpiece when the flat edge is in the preselected direction and for providing a signal indicative of the alignment of the workpiece for the system.

U.S. Pat. No. 3,846,901 issued to Lovett on Nov. 12, 1974—A resilient tubular sleeve of elastomeric material is disclosed having integral outwardly projecting ribs thereon to provide a replaceable surface for a conveyor roller. The ribs have intermittent contact with the conveyor belt in response to axial rotation of the roller to cause deformation of the belt and removal of adherent materials. The tubular sleeve has a smaller internal diameter, in its un-stressed condition, than the diameter of the roller on which it is mounted. The tubular sleeve is mounted on the roller by expanding its internal diameter sufficiently to permit it to slide axially along the roller to the desired position and thereafter permitting it to contract upon the roller surface and resiliently grip it. Convenient mounting methods for the tubular sleeve have been devised utilizing fluid under pressure to effect the expansion of the tubular sleeve.

U.S. Pat. No. 3,930,684 issued to Lasch, Jr. on Jan. 6, 1994—Apparatus and method are disclosed for automatically withdrawing silicon wafers or like articles from a supply magazine, transporting the same on a fluid bearing to a station where such articles are pre-aligned in sequence prior to treatment thereof at an adjacent mask aligner or like mechanism, and automatically discharging the articles following such treatment thereof onto another fluid bearing for transportation thereof into a discharge magazine. Sensor means is provided in conjunction with the supply magazine and discharge magazine for automatically indexing such magazines to feed and receive wafers in sequence moving relative thereto. During pre-alignment operation, each wafer is automatically rotated on an air bearing until it is oriented with a flat edge surface thereof in a predetermined position, which position is maintained as the wafer is transferred into the mask aligner where fine orientation thereof is completed, either manually or automatically, in accordance with the type of mask aligner apparatus with which the pre-alignment apparatus is combined.

U.S. Pat. No. 5,083,657 issued to Kelsey on Jan. 28, 1992—An endless flexible belt is disclosed which extends around a set of end rollers supported by a frame with the axes of the rollers defining an angle of 90 degrees therebetween, and one of the end rollers is driven by a variable speed electric motor and gear reducer unit. A pair of vertically spaced and non-rotating parallel belt guide tubes have end portions rigidly supported by the frame and extend within the belt at a transverse angle of 45 degrees for changing the direction of the belt travel by 90 degrees. The belt wraps around the tubes and extends between the tubes to the driven roller. Pressurized air is supplied to the tubes, and the air flows outwardly through spaced holes within a high pressure zone on each tube to produce a film of air between the tube and the belt portion extending around the tube. The air films permit circumferential and axial movement of the belt on each tube with minimum friction so that the belt may be driven at a high speed with minimum belt wear.

European Patent Application 0 246 627A—I, published Nov. 25, 1987—Method and apparatus are disclosed for loading/unloading a drum member. The apparatus includes an inner support member slidably arranged between a center shaft fixed to a frame and a drum member. When the drum member is required to be unloaded from the frame, the inner support member is ejected along the center shaft for a predetermined length, and then the drum member is drawn out while using the inner support member as a guide. The method includes the steps of providing a center shaft secured at one end to the frame; providing an inner support member slidably attached to the center shaft; providing a drum member supported its inner surface by the inner support member and being slidable along the center shaft axis; drawing out the inner support member for a predetermined length toward the outside of the frame; and drawing out the drum member toward the member of the frame by using the inner support member as a guide. By this apparatus and method, the drum can be drawn out easily and safely while using the inner support member as a guide.

European Patent Application 0 003 051 Al, published Jul. 25, 1979—A printing apparatus is disclosed of the type utilizing flexible, readily collapsible, imperforate thin metal sleeves wherein the sleeves are mounted in a device which maintains their cylindrical configuration rigidified by the introduction of fluid under pressure into the interior of the sleeve during use. A method of mounting the sleeve and several structures for supporting the sleeve are described. These include the provision of means in the printing press incorporating with the sleeve for maintaining its interior pressure and for stopping the press if the pressure should drop below a predetermined value. The sleeves may carry an exterior coating of flexible, micro-cyrstalline, inorganic photoconductive material such as sputtered ultra-pure cadmium sulfide.

U.S. Pat. No. 5,414,961, to Yu et al., filed Sep. 29, 1992. A method for fabricating a cylindrical device comprising having at least one distinct outer layer is disclosed comprising providing a preformed rigid cylindrical support drum having a predetermined outer circumference, a first end and a second end, providing a flexible belt having an inner circumference at least about 0.05 percent smaller than the outer circumference of the support drum, circumferentially expanding the belt with a flowing fluid under pressure until the circumference of the inner surface of the belt adjacent the first end is stretched to a new dimension at least about 0.1 percent greater than the outer circumference of the support drum while maintaining an elongation strain less than the elastic limit of the belt, sliding the belt onto the support drum from the first end toward the second end of the support drum until substantially all of the belt encircles the outer surface of the support drum and terminating the flow of the flowing liquid to allow the belt to contract onto the outer surface of the support drum. The fluid may either be a gas or a liquid. The cylindrical device fabricated by this process is preferably an electrostatographic imaging member. This electrostatographic imaging member may be utilized in an electrostatographic imaging process. The entire disclosure of copending U.S. patent application Ser. No. 07/953,610 is incorporated herein by reference.

However, fabrication of a cylindrical device using fluid pressure to expand the flexible electrophotographic imaging belt for mounting over a rigid support drum involves total stretching of the entire imaging belt. Excessive belt stretching is not desirable because it can increase the likelihood that tension induced coating layer cracking (particularly in the charge generation layer of a photoreceptor device due to inherent low material rupture strain) may develop. Tension induced coating layer cracking manifests itself in the form of copy print defects. Stretching of the entire imaging belt can sometimes distort the photoconductor layers, contribute to delamination and cracking, cause wrinkles where thicknesses are not closely maintained, cause misalignment of timing reference points, and the like.

When tubes are formed on a mandrel by coating operations and thereafter removed, the interior circumference of the tubes is normally equal to the exterior circumference of the mandrel. Thus, there are little or no compressive forces in the tube itself to aid in the prevention of slippage between the tube and the mandrel.

When flexible tubes are sealed at one end and inflated from the other end by means of a pressurized fluid to facilitate introduction of a support cylinder, the material is stretched circumferentially as well as axially. This two dimensional stretching operation is undesirable because the axial dimension (i.e. length) of the tube will contract with respect to the cylindrical support substrate after mounting and trimming of the sealed end, thereby exposing the edges of the cylindrical support substrate. Additionally, such an operation requires the use of an elaborate pressurized chamber which must also house the support cylinder that is inserted into the interior of the tube while the tube is in a stretched, pressurized condition.

Heat shrinking of a tube onto a mandrel can damage thermally sensitive coatings.

Thus, there is a continuing need for improved cylindrical devices, particularly electrostatographic imaging members having improved electrostatographic imaging properties.

SUMMARY OF THE INVENTION

It is, therefore, an object of the present invention to provide an improved method for fabricating cylindrical devices and products that overcome the above-noted disadvantages.

It is another object of the present invention to provide an improved cylindrical device, particularly electrostatographic imaging members, that captures the best attributes of both belt and drum designs without their respective shortcomings.

It is yet another object of the present invention to provide an improved cylindrical device, particularly electrostatographic imaging members, utilizing a flexible belt that exhibits superior tracking during cycling.

It is a further object of the present invention to provide an improved cylindrical device, particularly electrostatographic imaging members, having extended functional life.

It is still a further object of the present invention to provide an improved cylindrical device, particularly electrostatographic imaging members employing fluid pressure to expand a flexible belt for mounting over a rigid drum support, free of tensile stretching induced coating layer cracking.

It is still another object of the present invention to provide an improved electrostatographic imaging member which facilitates registration of images.

It is a further object of the present invention to provide an improved electrostatographic imaging member which exhibits longer life during repeated cycling.

It is yet another object of the present invention to provide an improved cylindrical device that can more readily be recycled.

The foregoing objects and others are accomplished in accordance with this invention by providing a flexible belt comprising a major segment and at least one narrow minor segment extending from one end of the belt to the opposite end and being more extendible than the major segment under the same externally applied tension. This belt may be a component of a composite cylindrical device comprising a rigid drum substrate supporting the flexible belt in a stretched condition. The composite cylindrical device may be fabricated by providing a preformed rigid cylindrical support drum having a predetermined outer circumference, a first end and a second end, providing a flexible belt having an outer surface and an inner surface circumference of at least about 0.05 percent smaller than the outer circumference of the support drum, the belt comprising a major segment and at least one narrow minor segment, the narrow minor segment extending from one end of the belt to the opposite end, circumferentially expanding the belt with a flowing fluid under pressure until the inner surface circumference of the belt adjacent the first end is stretched to a new dimension of at least about 0.1 percent greater than the outer circumference of the support drum while maintaining the belt below the elastic limit of the belt, sliding the belt onto the support drum from the first end toward the second end of the support drum until substantially all of the belt encircles the outer surface of the support drum, and terminating the flow of the flowing liquid to allow the belt to contract onto the outer surface of the support drum. The fluid may be either a gas or a liquid. The cylindrical device fabricated by this process is preferably an electrostatographic imaging member. This electrostatographic imaging member may be utilized in an electrostatographic imaging process.

This narrow minor segment may, for example, have a thinner cross-sectional area than the major segment to concentrate the applied stress for ease of belt stretching or comprise a strip of material different from that of the imaging member and having a Young's modulus less than the Young's modulus of the major segment and an elasticity limit at least as great as the elasticity limit of the major segment. The expression "elasticity limit" as employed herein is defined as the maximum extent of elongation at which a material can sustain under an applied stress while retaining its capability of recovering to its original dimension without exhibiting distortion after the applied stress is removed.

BRIEF DESCRIPTION OF THE DRAWINGS

A more complete understanding of the device and process of the present invention can be obtained by reference to the accompanying drawings wherein:

FIG. 12 is a schematic illustration of another embodiment of a section of a rigid cylindrical support drum fitted with a removable fluid supply cap.

FIG. 13 is a schematic illustration of either a belt adjacent one end of a rigid cylindrical support drum or a rigid cylindrical support drum adjacent one end of a temporary imaging belt transport drum.

FIG. 14 is a schematic illustration of a flexible belt supported on a rigid drum substrate which shows belt overhang.

FIG. 15 is a schematic illustration of a section of a flexible belt being mounted onto a rigid cylindrical support drum.

FIGS. 16(a) through (c) are schematic cross sectional illustrations of rigid cylindrical support drums with various embodiments of fluid feed line and manifold configurations to feed fluid to vent apertures, FIG. 17 is a side view of a schematic cross sectional illustration of a locking lug and slot embodiment to join one end of a rigid cylindrical support drum to another member.

FIG. 18 is a plan view of the schematic cross sectional illustration of the locking lug and slot embodiment shown in FIG. 17.

FIG. 22 is a side view of a schematic cross sectional illustration of a bolt and butterfly locking nut embodiment for joining one end of a rigid cylindrical support drum to another member.

FIG. 23 is a schematic cross sectional illustration of a rigid cylindrical support drum supporting an electrostatographic imaging belt having an electrically conductive paint extending from the outwardly facing surface of a ground strip layer to the rear surface of belt.

FIG. 24 is a plan view of a sectional illustration of a rigid cylindrical support drum supporting an electrostatographic imaging belt with an electrically conductive adhesive tape applied to both a ground strip layer of the belt and the exposed surface of drum 16.

FIG. 25 is a sectional end view of a seamless flexible electrophotographic imaging belt having a thin narrow minor segment cross-sectional region extending axially of the belt to facilitate belt expansion by a pressurized fluid during mounting.

FIG. 29 is an expanded sectional view of a seamed belt having a thin narrow minor segment.

FIG. 30 is an expanded sectional view of a seamed belt having a narrow minor segment of different material and with a thickness about the same as that of the major segment.

These figures merely schematically illustrate the invention and are not intended to indicate relative size and dimensions of the imaging belt, rigid cylindrical support drum or components thereof.

DETAILED DESCRIPTION OF THE DRAWINGS

For the sake of convenience, the invention will be described in relation to fabrication of cylindrical devices comprising a rigid cylindrical support drum having at least one distinct outer layer such as a flexible electrostatographic imaging belt under tension. The invention, however, is applicable to other cylindrical devices comprising a rigid cylindrical support drum having at least one distinct outer layer such as a fuser roll, drive roll, developer applicator, idler roll and the like.

Figure 1:
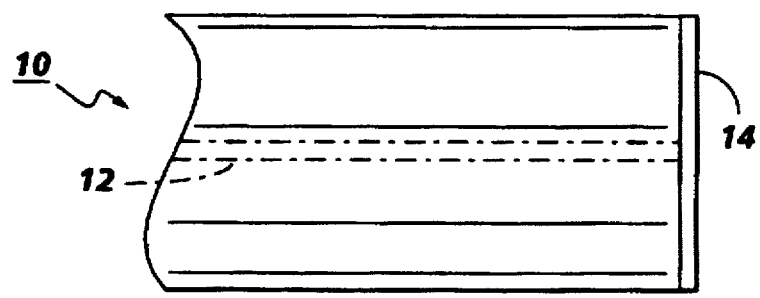
FIG. 1 is a schematic illustration of a section of a flexible seamed belt.

Referring to FIG. 1, a flexible seamed electrostatographic imaging belt 10 is shown having a welded seam 12 extending transversely across the width of belt 10 and an electrically conductive ground strip 14 along one edge.

Figure 2:
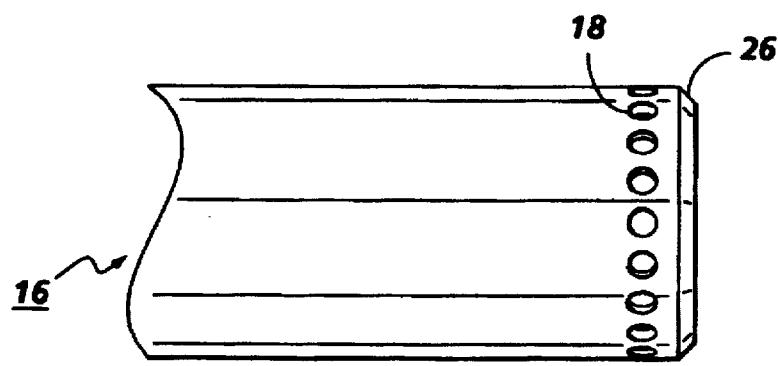
FIGS. 2 through 5 are schematic illustrations of segments of rigid cylindrical support drum embodiments with various vent aperture shapes and locations.
Figure 3:
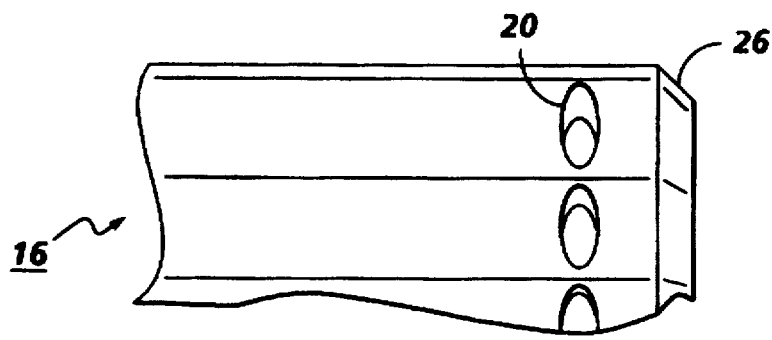
Figure 4:
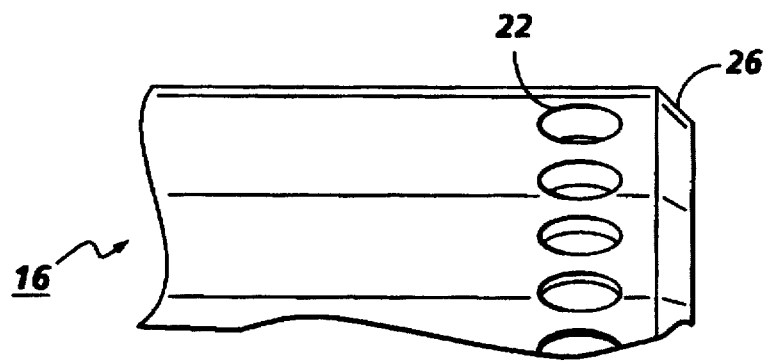
Figure 5:
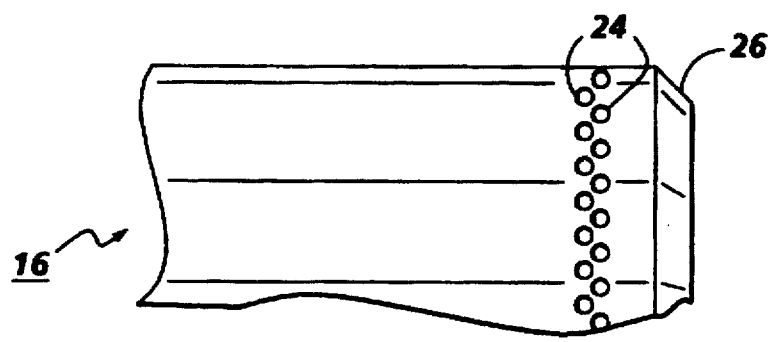

In FIGS. 2 through 5, various embodiments of fluid feed aperture shapes, sizes and placement are shown adjacent one end of a rigid cylindrical support drum 16. In FIG. 2, the feed apertures 18 are round and positioned in a single row around the periphery of support drum 16. Oval apertures 20 and 22 are shown in single rows at one end of a support drum 16 in FIGS. 3 and 4. Two rows of staggered apertures 24 are shown at one end of support drum 16 in FIG. 5. The end of support drum 16 adjacent the apertures shown in FIGS. 2 through 5 are chamfered to form a beveled surface 26 which serves as an aid for sliding belt 10 onto support drum 16. In all of the embodiments illustrated in FIGS. 2 through 5, the apertures 18, 20, 22 and 24 are spaced a short distance from the outermost edge of beveled surface 26.

Figure 6:
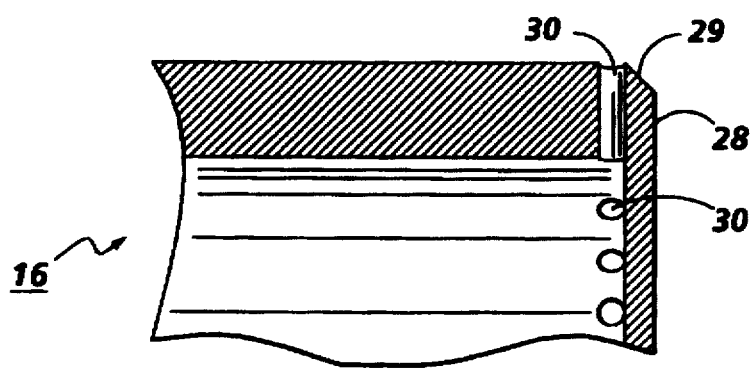
FIGS. 6 through 8 are schematic illustrations of segments of rigid cylindrical support drum embodiments having different end shapes and wall thicknesses.
Figure 7:
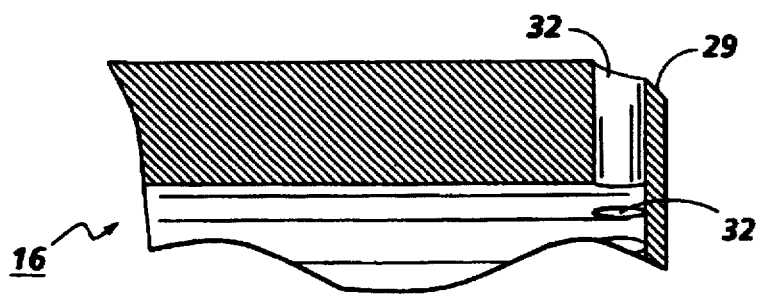
Figure 8:
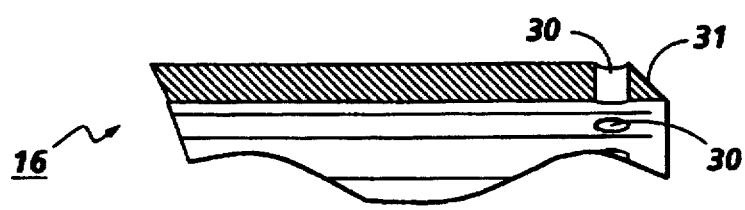

Referring to FIGS. 6 through 8, various drum end configurations are shown. In FIG. 6 the end of support drum 16 is sealed by an integral wall 28 or a removable flat disk shaped member. Wall 28 has a beveled edge or surface 29. The outermost edge (relative to the drum axis) of beveled surface 29 tangentially contacts the outer edge of apertures 30. Also, In FIG. 7, the outer edge of aperture 32 extends into beveled surface 29. The relatively thin support drum 16 shown in FIG. 8 has a beveled end 31 and aperture 30, but without the integral wall such as the integral wall 28 illustrated in FIG. 6.

Figure 9:
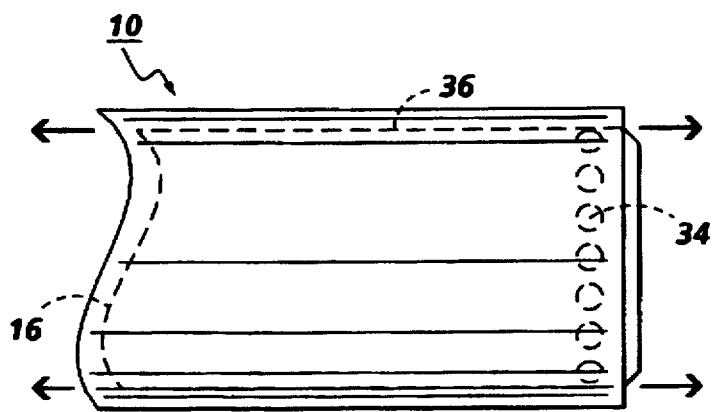
FIG. 9 is a schematic illustration of a section of a flexible seamed belt surrounding a rigid cylindrical support drum.

In FIG. 9, a flexible electrostatographic imaging belt 10 is illustrated surrounding and coaxially aligned with support drum 16, but separated therefrom by a thin film of pressurized fluid introduced through apertures 34 into the space between the inner surface of belt 10 and outermost surface 36 of support drum 16 and expelled at each end of belt 10 as shown by the arrows.

Figure 10:
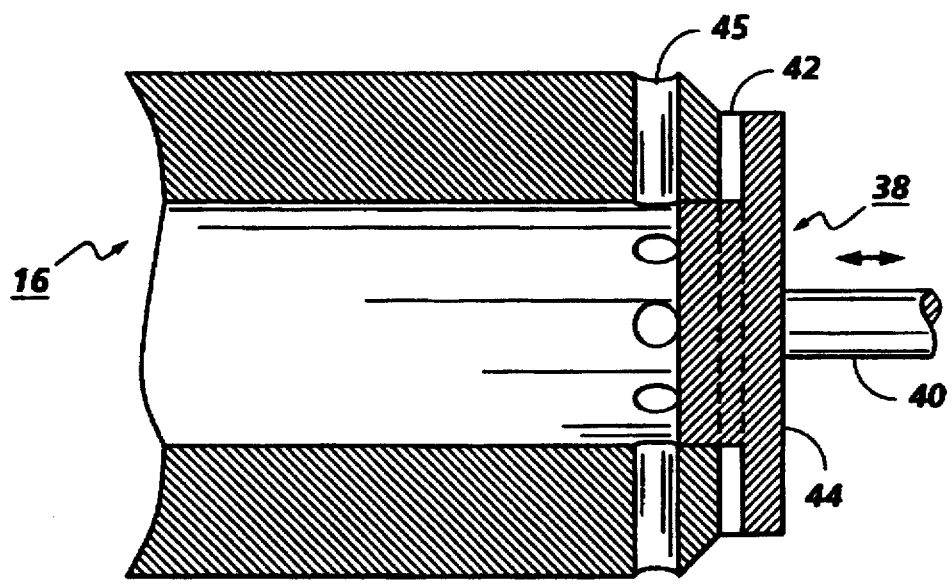
FIG. 10 is a schematic illustration of a section of a rigid cylindrical support drum fitted with a removable end plug.

Referring to FIG. 10, support drum 16 is sealed at one end by a removable end plug 38 carried on the end of reciprocatable shaft 40. A gasket 42 of resilient material is positioned between support drum 16 and lip 44 of flange 38 to enhance achievement of a fluid tight seal. Although removable end plug 38 is shown in FIG. 10 at the end of support drum 16 having apertures 45, it may be used at the opposite end, if desired.

Figure 11:
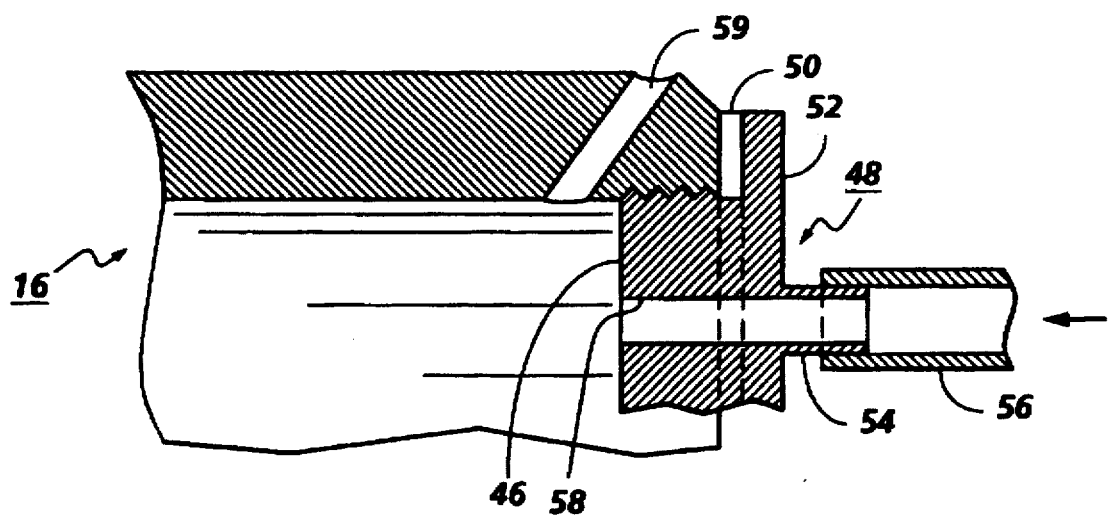
FIG. 11 is a schematic illustration of one embodiment of a section of a rigid cylindrical support drum fitted with a removable fluid supply cap.

FIG. 11 shows support drum 16 with the inner surface of one end threaded to receive a threaded male extension 46 of a removable fluid supply cap 48. A gasket 50 of resilient material is positioned between support drum 16 and lip 52 of flange 48 to enhance achievement of a fluid tight seal. Cap 48 also comprises a tubular extension 54 around which one end of fluid supply tube 56 is mounted. Fluid from any suitable source such as a compressed air tank (not shown) is introduced into the interior of support drum 16 from fluid supply tube 56 through channel 58 extending through cap 48. The fluid introduced into the interior of support drum 16 is expelled through a plurality of inclined apertures 59. Although removable fluid supply cap 48 is shown in FIG. 11 at the end of support drum 16 having apertures 59, it may be used at the opposite end or both ends of support drum 16, if desired.

In FIG. 12, support drum 16 has one end partially closed by annular wall 60. The periphery of the opening in annular wall 60 is threaded to receive a threaded male extension 62 of a removable fluid supply cap 64. Removable fluid supply cap 64 also comprises a tubular extension 66 to which a fluid supply tube (not shown) may be connected. Fluid can be introduced into the interior of drum 16 through channel 68 extending through fluid supply cap 64. Although removable fluid supply cap 64 is shown in FIG. 12 at the end of support drum 16 having no apertures, it may be used at the opposite end or both ends of support drum 16, if desired.

Referring to FIG. 13, a hollow cylinder 70 is shown with one end 72 closed and the opposite end essentially closed except for a fluid supply tube 74 for supplying fluid into the interior of hollow cylinder 70. The outermost surface of hollow cylinder 70 carries rectangular shaped apertures 76 near end 72. Depending upon the objectives desired, cylindrical member 78 may represent a flexible imaging belt or a rigid cylindrical support drum and hollow cylinder 70 may represent a rigid cylindrical support drum or a temporary imaging belt transport drum. In the embodiment where cylindrical member 78 represents a flexible imaging belt, it is intended that hollow cylinder 70 represents a rigid cylindrical support drum. In the embodiment where cylindrical member 78 represents a rigid cylindrical support drum, it is intended that hollow cylinder 70 represents a temporary imaging belt transport drum from which an imaging belt (not shown) is slid from hollow cylinder 70 onto cylindrical device 78 while fluid flowing under pressure is supplied through apertures 76.

In FIG. 14 is an imaging belt 10 is shown supported on a rigid cylindrical support drum 16. Although part of one end of belt 10 is shown overhanging the closed end 80 of support drum 16, one or both edges of belt 10 may optionally overhang, or be flush with or be set back from the closed end 80 of support drum 16. This overhanging material may remain during use of the finished product or be trimmed off by suitable means such as a knife blade.

Illustrated in FIG. 15, is an imaging belt 10 that is being slid onto a rigid cylindrical support drum 16 as a fluid is introduced into the hollow interior of rigid cylindrical support drum 16 via inlet conduit 82 and allowed to exit from the interior of the rigid cylindrical support drum 16 through apertures 84. A twisting motion represented by the arrow may, if desired, be imparted to imaging belt 10 to aid mounting of belt 10 onto support drum 16 as the fluid expands and stretches imaging belt 10. Alternatively, support drum 16 may be twisted instead of belt 10 or both belt 10 and support drum 16 may be simultaneously twisted in opposite directions during the mounting process. Once imaging belt 10 is fully mounted onto support drum 16, the flow of of fluid through conduit 82 may be terminated or reduced to allow imaging belt 10 to contract onto support drum 16. Removal of belt 10 from rigid cylindrical support drum 16 may be effected by pulling belt 10 from support drum 16 while a fluid is forced out of apertures 84. Removal of belt 10 is desirable for replacement reasons.

Referring to FIGS. 16(a), (b) and (c), schematic cross sectional views are shown of various manifold configurations 86, 88 and 90 which are utilized to distribute fluid supplied via conduit 92 and feed lines 94 to vent channels 96. The use of conduits 92 and feed lines 94 reduce the amount of fluid needed to achieve the desired stretching thereby accelerating the belt mounting process.

Figure 19:
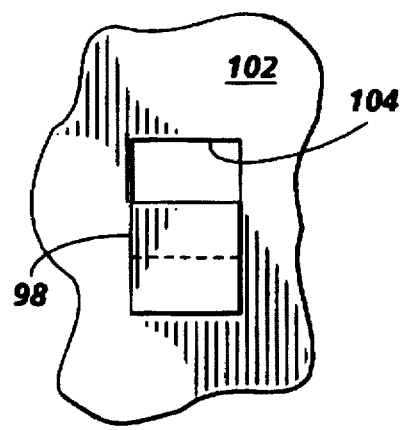
FIG. 19 is an end view of the schematic cross sectional illustration of the locking lug and slot embodiment shown in FIGS. 17 and 18.

In FIGS. 17, 18 and 19, a temporary locking arrangement embodiment is shown for maintaining the ends of transport drum 70 (serving as a temporary imaging belt transport drum) and rigid cylindrical support drum 78 (see FIGS. 13 and 17) together while an electrostatographic imaging belt (not shown) supported by continuously flowing fluid under pressure introduced through apertures 71 is slid from hollow cylinder 70 onto rigid cylindrical support drum 78. An "L" shaped lug 98 extends from one end of transport drum 70. This "L" shaped lug 98 has a lip 100 adapted to engage inner wall 102 of support drum 78 to achieve temporary locking of the two devices together (see FIGS. 18 and 19). Locking is initiated by inserting "L" shaped lug 98 through slotted opening 104 in wall 102 of support drum 78. Locking is completed by twisting transport drum 70 and/or support drum 78 to slide lip 100 over inner wall 102 of rigid cylindrical support drum 78. Disengagement of transport drum 70 from support drum 78 may be achieved by reversing the engagement steps. Alternatively, the "L" shaped lug may carried by support drum 78 and slotted opening 104 may be formed in the end wall of transport drum 70 (not shown).

Figure 20:
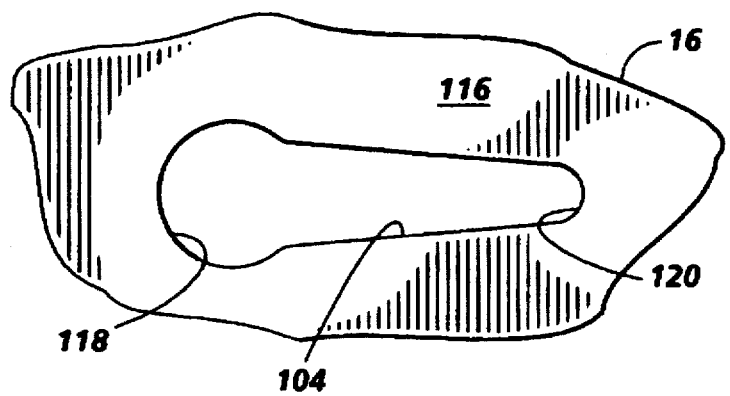
FIG. 20 is an end view of a schematic illustration of another embodiment of a slot for a locking lug to join one end of a rigid cylindrical support drum to another member.
Figure 21:
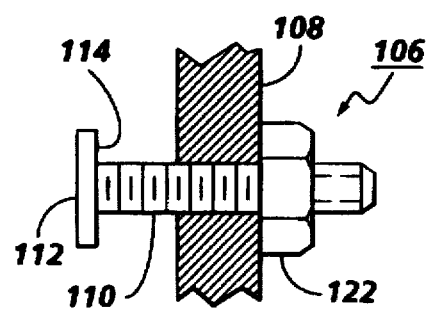
FIG. 21 is a side view of a schematic cross sectional illustration of a locking lug for use with the slot shown in FIG. 20.

Shown in FIGS. 20 and 21 is a schematic illustration of another temporary locking embodiment utilizing a keyhole slot 104 (see FIG. 20) into which a locking lug 106 (see FIG. 21) is inserted to join one end of a rigid cylindrical support drum 16 to one end of transport drum 108. Locking lug 106 comprises a threaded shaft 110 screwed into a threaded hole in one end of transport drum 108. Threaded shaft 110 comprises a flat cap 112 having a lip 114 which engages the inner surface 116 of rigid cylindrical support drum 16 after locking lug 106 is inserted into the large end 118 of keyhole slot 104 and slid toward the narrow end 120. A lock nut 122 secures threaded shaft 110 in place.

In FIG. 22, still another temporary locking embodiment in which one end of a rigid cylindrical support drum 16 is temporarily secured and abutted to one end of transport drum 70. In this embodiment, a bolt having a hexagonal head 124 is inserted into a hexagonal recess in one end of rigid cylindrical support drum 16 the threaded portion 126 of the bolt extends through a hole in the ends of rigid cylindrical support drum 16 and transport drum 70. Tightening of wing nut 128 on threaded portion 126 of the bolt temporarily maintains the ends of rigid cylindrical support drum 16 and transport drum 70 together. If desired, the direction of the bolt may be reversed (not shown) so that the threaded portion 126 extends into the interior of rigid cylindrical support drum 16 instead of into the interior of transport drum 70. In this latter embodiment, wing nut 128 would be tightened onto threaded portion 126 from the opposite side. In still another embodiment (not shown), the threaded portion 126 may be in the form of a permanent stud extending from the end of transport drum 70.

Shown in FIG. 23, is a cross-sectional view of a metallic electrically conductive rigid cylindrical support drum 16 supporting an electrostatographic imaging belt 140. For purposes of illustration, the scale of the layers of belt 140 has been greatly exaggerated. Belt 140 comprises an anti-curl backing layer 142, a flexible supporting substrate 143, an electrically conductive layer 144, a charge blocking layer 145, an adhesive layer 146, a charge generating layer 148, a charge transport layer 150 and a ground strip layer 152 located along one edge of belt 140. A thin electrically conductive paint stripe 154 extends from the outwardly facing surface of ground strip layer 152 around the edge of belt 140 to the rear surface of belt 140. If desired, an electrically conductive adhesive tape, electrically conductive glue or other suitable means (not shown) may be substituted for electrically conductive paint stripe 154. The electrically conductive rigid cylindrical drum 16 functions as a path through a drum support shaft (not shown) to ground or to an electrical bias source (not shown).

In FIG. 24, a plan view of a metallic electrically conductive rigid cylindrical support drum 16 supporting an electrostatographic imaging belt 160 is illustrated. Belt 160 comprises layers similar to belt 140 shown in FIG. 24. A small segment of ground strip layer 162 and all underlying layers located along one edge of belt 160 have been removed (inside border of the segment removed is shown by a phantom line 163) to expose the underlying electrically conductive surface of drum 16. An electrically conductive adhesive tape 164 is applied to both the ground strip layer 162 and the exposed surface of drum 16 to electrically connect ground strip layer 162 and drum 16.

Illustrated in FIG. 25 is an end view of a seamless flexible electrophotographic imaging member belt of this invention, represented for reasons of convenience, by a simplified three-layer structure comprising a back coating layer 165, a substrate layer 166 and an outer electrically active imaging layer 170. This belt also comprises a major segment comprising most of the belt and a thin narrow minor segment, band or strip which extends in an axial direction from one end of the belt to the other, the outer surface of the thin narrow minor segment comprising a depression 171. Generally, the major segment has a uniform thickness. The thin narrow minor segment embodiment provides a region of stress concentration to greatly facilitate belt expansion during mounting of the belt on a rigid drum. The thin narrow minor segment embodiment is usually created by removing a portion of material from the original belt blank. However, in a less preferred embodiment, the thin narrow minor segment may be attached to the original belt blank by any suitable technique such as welding. When the thin narrow minor segment is fastened to a belt blank, the thin narrow minor segment may comprise a material that is identical to or different from the materials present in the original belt blank. Thus, formation of a thin narrow minor segment 171 having material removed from the outer periphery may be accomplished by any suitable process. Typical processes for removing material from a belt blank include, for example, laser ablation, mechanical wheel grinding/polishing, pressure embossing at an elevated temperature, chemical etching, argon sputtering, and the like. The formation of a thin narrow minor segment in electroformed belts, such as nickel belts, can be readily formed by simply masking a portion of the cathode during conventional electrodeposition. More specifically, this can be done by attaching a nonconducting rod to the electrodeposition mandrel on which the electroform is deposited so that the rod is held away from the mandrel but rotates with it. A thin narrow minor segment may also be formed in plastic belts by placing a heated rod against it to heat a strip of the belt to, at least, its glass transition temperature ($T_g$) and then applying sufficient force to depress the heated portion of the belt until it is thinner than the rest of the belt. For electrostatographic imaging members, the width of the thin narrow minor segment 171 is preferably between about 1.2 cm (0.47 inch) and about 4 cm (1.57 inches). A width for the thin narrow minor segment of less than about than 1.2 cm (corresponding to about 2 percent of the circumferential dimension of the belt) requires the application of extremely high stress which leads to deformation exceeding the ultimate elongation limit of the imaging layer (or layers) in the belt thereby causing the development of imaging layer cracking. The cracks formed from material failure manifest themselves as copy print defects. Generally, a thin narrow minor segment exceeding 4 cm (corresponding to about 7 percent of the circumferential dimension of the belt) in width tends to squander too much area of the belt which would otherwise be available for imaging.

A satisfactory thickness for the thin narrow minor segment embodiment is between about 40 percent and 70 percent of the thickness of the rest of the imaging member (i.e. major segment) because a thickness of less than about 40 percent can focus too much stress and weaken the belt, whereas a thin segment thickness greater than about 70 percent of that of the imaging member may not provide the desired ease of stretching during belt expansion and contribute to the development of imaging layer cracking. For best results, a thin narrow minor segment thickness of between about 45 percent and about 60 percent of the thickness of the rest of the imaging member is particularly preferred. The expression "narrow minor segment", as used herein, is defined as a segment, band or strip extending from one end of a belt to the opposite end. The narrow minor segment may have a depression or crater along the inner and/or outer surface of a belt and/or may comprise a material the same as or different from the materials in the the major segment of the belt. Moreover, the narrow minor segment may have a Young's modulus of about the same or less than the Young's modulus of the major segment and have an elasticity limit equal to or greater than the elasticity limit of the major segment. The expression "thin narrow minor segment", as used herein, is defined as a segment, band or strip having the same characteristics as the "narrow minor segment" and also having a thickness so much less than the thickness of the rest of the imaging member belt that the difference can be detected with the naked eye. It is important to note that when the belt of this invention contains a thin narrow minor segment, the thin narrow minor segment should provide sufficient protection for the major segment to prevent the development of cracks in imaging layers by concentrating the applied stress and confining and localizing most of the belt stretching within the thin narrow minor segment during belt expansion and mounting over a rigid drum support. Thus, the entire narrow minor segment should be capable of stretching a greater distance along its circumferential length under an externally applied tension than the distance of a sample of the major segment material having the same original circumferential length subjected to the same externally applied tension.

Figure 26:
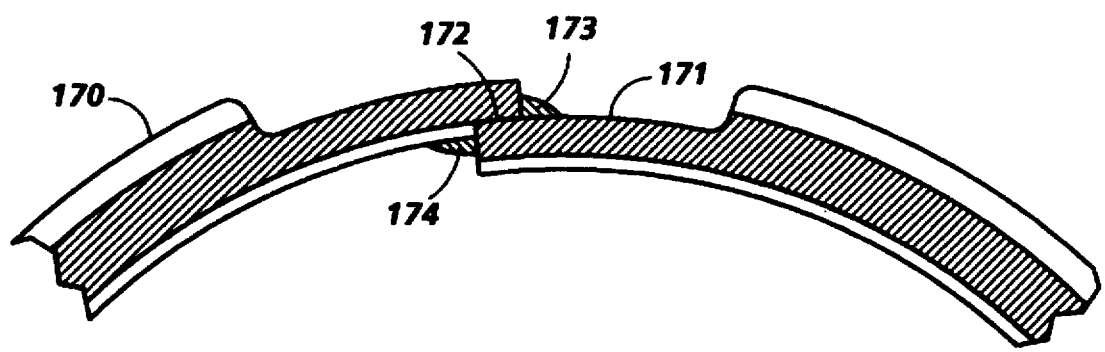
FIG. 26 is an expanded sectional view of an embodiment of a seamed belt having a thin narrow minor segment.

FIG. 26 shows a side view of a partial representation of a flexible electrophotographic imaging member belt having an indentation or crater 171 along the outer surface of the thin narrow minor segment similar to the one described in FIG. 25, except that an overlapped ultrasonic welded seam is present along the centerline of the thin narrow minor segment. The seam has an overlapped region 172 having a width of between about 0.8 mm and about 1.5 mm and also has seam splashes 173 and 174 adjacent to the overlapped region. The seam can be formed either prior to or after the imaging member is subjected to a segmental thinning treatment. For example, the opposite ends of an imaging member sheet may be rendered thinner by means of a laser ablation or grinding treatment prior to overlapping and seam welding operation, thereby forming a seam which is thicker in the middle of the thin minor segment as illustrated in FIG. 26. Alternatively, a seam having the same thickness as that of the thin segment strips located on each side of the seam can be obtained by a material removal step subsequent to the overlapping and ultrasonic seam welding steps. The imaging belt embodiment of FIG. 26 having a seam structure situated within and in the middle of the thin narrow minor segment is particularly preferred because the outer imaging surface of between about 0.6 cm (0.25 inch) and about 1.9 cm (0.75 inch) immediately adjacent each side of a seam is usually treated as a non-imaging area for actual xerographic imaging on seamed belt photoreceptors. In embodiments where a relatively thick seam extends down the middle of a thin narrow minor segment, the sum of the circumferential lengths of the thin regions on each side of the seam should preferably equal between about 1.2 cm and 4 cm and have a thickness of between about 40 percent and 70 percent of the thickness of the rest of the imaging member, i.e. the thickness of the major segment. Instead of utilizing a material removal step to form a thin region which ultimately comprises the final thin narrow minor segment, a web may be coated on one side in the central region, e.g. by extrusion coating, thereof while leaving both edges of the web uncoated. After slicing the web transversely to form belt blanks, the uncoated edges (rather than the freshly sliced ends) may be brought together and joined by any suitable technique such as welding. The final joint would have the appearance of the belt shown in FIG. 26.

Typically, in a 60 cm circumference belt having a narrow minor segment or segments of different material than those in the imaging member of the major segment, the narrow minor segment or segments utilized in the belts of this invention preferably have a total about between about 1.2 cm and about 4 cm, a Young's modulus less than the Young's modulus of the major segment, and an elasticity limit equal or greater than the elasticity limit of the major segment of the belt. More specifically, the Young's modulus of the narrow minor segment is preferably between about 30 percent and about 60 percent of the Young's modulus of the major segment of the belt. The elasticity limit of the narrow minor minor segment is preferably between about the same and about 10 times greater than the elasticity limit of the major segment of the belt. These properties ensure that the narrow minor segment stretches sufficiently relative to the rest of the belt to permit mounting onto a support drum without exceeding the elasticity limit of any of the layers in the major segment of the belt. The avoidance of undue stretching of the major segment of the belt prevents the possibility of cracking development in the electrically active layers of the major segment that are relatively fragile under tension. Cracking of electrically active layers in the major segment can lead to print defects in electrostatographic images.

Figure 27:
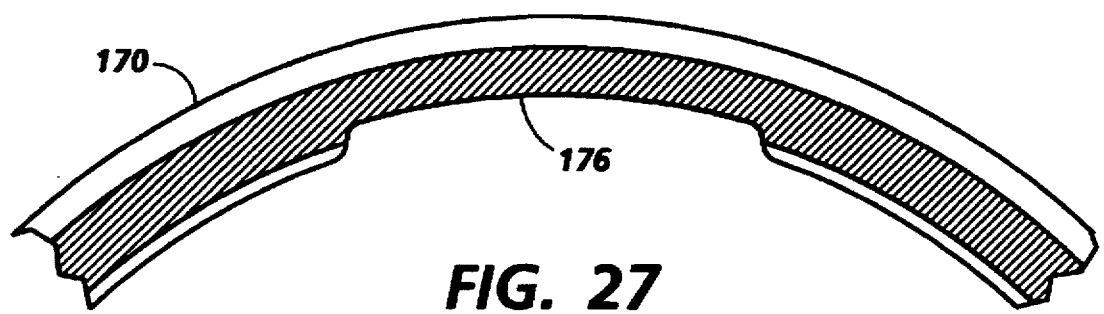
FIG. 27 is an expanded sectional view of another embodiment of a seamless belt having a thin narrow minor segment.
Figure 28:
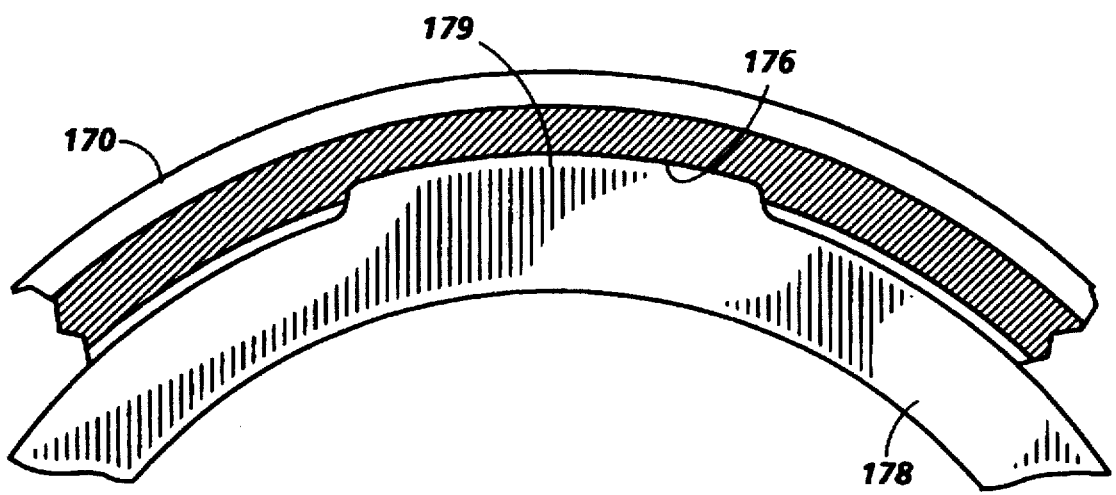
FIG. 28 is a sectional, expanded view of a rigid drum support having an outer surface projection which mates with the indented profile of a thin narrow minor segment of a seamless belt.

Shown in FIG. 27 is the side view of another imaging member embodiment where formation of the thin narrow minor segment is effected at the backside (inside surface) of a belt by displacing the back (inner) coating and part of the substrate with an ultraviolet laser ablation process to create a depression of new surface 176 having a precisely predetermined width and depth. Although acceptable for seamed belt applications, this ultraviolet laser ablation technique for forming the thin narrow minor segment is particularly preferred for seamless belt applications, because the outer electrically active imaging layer 170 is unaltered thereby allowing the entire imaging belt surface to be effective for imaging. Furthermore, if a rigid supporting drum 178 (See FIG. 28) over which the seamless belt is to be mounted is fabricated so that it has a male surface projection 179 having a profile which perfectly mates with the female depression profile 176 of the thin narrow minor segment as illustrated in FIG. 28, the entire outer surface of the outer electrically active imaging layer 170 will be free of any perturbations and will be fully available for imaging. Moreover, the frictional force, generated at the contacting surfaces between the belt and the drum by the compressive pressure exerted by the belt, may be reduced without encountering slippage of the belt relative to the drum during an imaging cycle because the mating of drum surface projection 179 with the belt depression profile 176 provides an added mechanical interlocking effect.

FIG. 29 presents a hybrid combination where a thin narrow minor segment in a belt has the combined characteristics of the embodiments shown in both FIGS. 26 and 27. Thus, the thin narrow minor segment comprises an outer depression 180, an inner depression 182, an overlapped region 172, and seam splashes 173 and 174 adjacent to the overlapped region. The configuration shown in FIG. 29 is another preferred embodiment of a thin narrow minor segment for flexible seamed belt applications. The seam thickness profile can be uniform and have the same thickness as that of the thin segment on each side of the seam by subjecting the seam to any suitable material removal process, such as ablation or grinding, after the seam forming operation. Instead of utilizing material removal steps on each end of a belt blank to form thin regions that ultimately become part of the final thin narrow minor segment, a web may be coated on both sides, e.g. by extrusion coating, in the central region thereof while leaving the edges of the web uncoated. After slicing the web transversely to form belt blanks, the uncoated edges may be brought together and joined by any suitable techniques such as welding. The final joint would have the appearance of the belt shown in FIG. 29.

In FIG. 30, another embodiment of this invention is illustrated in which a narrow minor segment 184 of a belt is formed from a strip of any suitable material that may be different from the materials of the imaging member in the major segment 186 of the belt. The narrow minor segment 184 may be joined to the major segment by any suitable technique such as welding, gluing or the like. In this embodiment, each long side of a strip is secured to opposite ends of major segment 186. The thickness of narrow minor segment 184 may be greater than, the same as, or thinner than the thickness of major segment 186. However, the narrow minor segment 184 should preferably have a width between about 1.2 cm and about 4 cm. Also, the Young's modulus of narrow minor segment 186 is preferably between about 30 percent and about 60 percent of the Young's modulus of the major segment 186. The elasticity limit of narrow minor segment 184 is preferably between about the same and 10 times greater than the elasticity limit of the major segment 186. Typical combinations of materials include, for example, polyamide, polyethylene, polypropylene, thermoplastic polyurethane ellastollan, thermoset polyurethane elastomer, polybutadiene, vulcanized rubber, crosslinked polysiloxane, and the like in narrow minor segment 184 in combination with a major segment 186 comprising a layer of polyethylene terephthalate (e.g. Mylar, Meinex, and Hostaphan), polyethylene naphthalate (e.g. Kadelex), polyimide (e.g. Kapton and Upilex), poly ether ether ketone (e.g. Stabar K200 and Stabar XK 300), polyether sulfone (e.g. Stabar 5100), polycabonate (Makrofol), polyvinyl flourida (Tedlar), nickel, and the like. Because two joining steps are involved in the fabrication of the embodiment shown in FIG. 30, it is less preferred than the single joining step embodiments described above.

Figure 31:
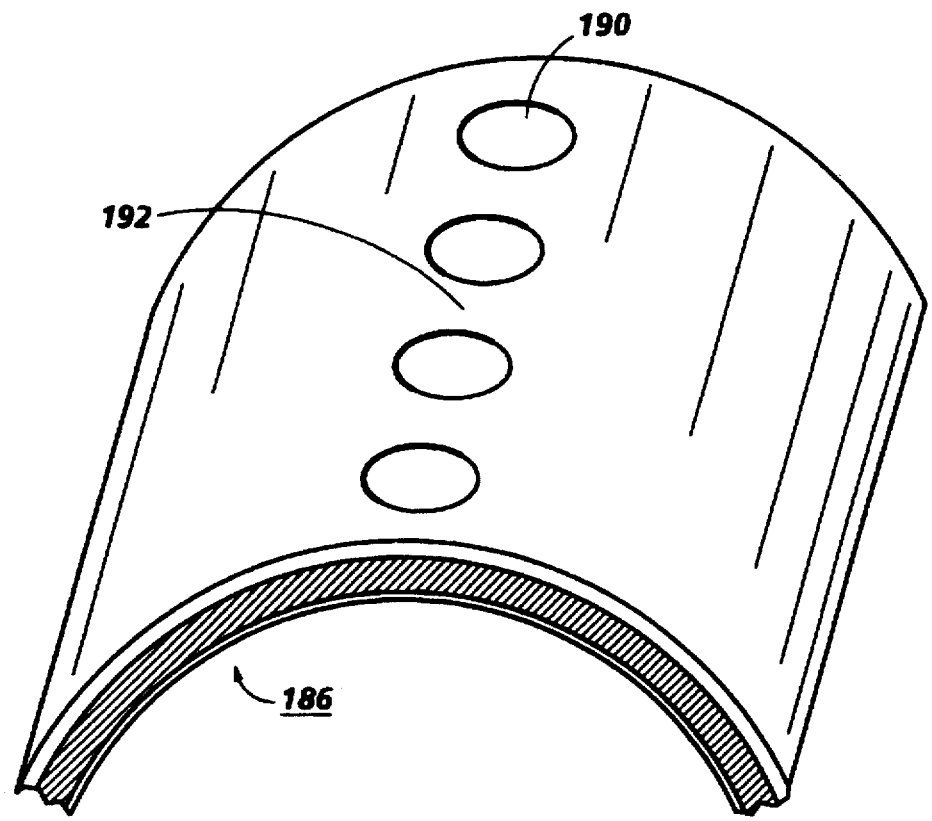
FIG. 31 is an expanded sectional view of a seamless belt with a narrow minor segment containing holes.

In still another embodiment, a thin narrow minor segment of a seamless or seamed belt may formed by treating a narrow strip of the belt or belt blank with mechanical, heat, chemical or other suitable means to render its ability to become readily extendible than the major segment of the belt in response to an applied tensile stress. For example, as illustrated in FIG. 31, elliptical holes 190 extending axially of a seamless belt 186 may be created with a mechanical punch out device in a narrow minor segment containing material 192 between holes 190. Since holes 190 decrease the total cross sectional area across the width of the belt along an imaginary centerline extending through holes 190 along the length of the narrow minor segment, a greater amount of stress is concentrated in this narrow minor segment than in the major segment 186 thereby facilitating stretching during the belt expansion process without damaging any critical layers in major segment 186. For a flexible seamed belt, the seam is situated in the imaginary centerline of the holes. In essence, the narrow minor segment in FIG. 31 functions like the thin narrow segments described in FIGS. 25 through 27. The holes 190 may be of any suitable shape. Typical shapes include round, oval, rectangular, triangular, trapezoidal, square, and the like. Oval holes are preferably are aligned so that the long axis of each hole is parallel to the ends of the belt because it can prevent crack initiation through the holes followed by propagation leading to belt rupture during belt expansion process. If desired, the holes may be arranged in a single row or plurality of rows. The holes in any given row or in adjacent rows may be aligned or staggered with holes in adjacent rows. The size and number of holes per unit area depends upon various factors such as the thickness, Young's modulus, and elasticity of the original belt blank. However, the size and number of holes per unit area should be sufficient to achieve about 150 percent to about 300 percent greater stretching capability in the narrow minor segment than in the major segment of the belt. Preferably, the holes are filled with a material after mounting of the belt onto the rigid drum support. Typical filing materials include, for example, paraffin wax, epoxy, polyurethane, polycarbonate, and the like. Filling of the holes is particularly desirable for electrostatographic imaging members to prevent trapping of toner material which could later be released during an imaging cycle and which could adversely affect image quality. The holes in the narrow minor segment need not extend completely through the segment. Thus, the holes may only partially penetrate the narrow minor segment and appear as depressions. Partial penetration may be achieved by using chemical etching, heat and pressure, laser ablation, argon sputtering, mechanical techniques, and the like.

If desired, a plurality of narrow minor segments may be utilized on a belt. However, the formation of a plurality of narrow minor segments on a belt usually requires multiple fabrication steps and can render more difficult consistent achievement of close tolerances from belt to belt.

Any suitable thin flexible belt may be mounted on the rigid cylindrical support drum. Flexible belts, such as thin electrostatographic imaging belts, are well known in the art. Typical thin flexible electrophotographic imaging belts are described, for example, in U.S. Pat. Nos. 4,265,990, 4,747, 992, 4,711,833 and 3,713,821, the entire disclosures of these patents being incorporated herein by reference. The flexible belt may have a welded seam or may be seamless. The belt should be flexible and stretchable. The expression "flexible", as used herein, is defined as bendable without exhibiting mechanical failure such as when cycled around various sizes of conventional support rollers during electrostatographic imaging in an automatic copier, duplicator or printer. The word "stretchable", as utilized herein, is defined as readily extendible to a moderate strain without rupture in response to an applied stress. Preferably, the belt should be capable of stretching to a value at least greater than about 0.1 percent strain without exceeding the elasticity limit of the belt. In general, the elasticity limit is determined from the linear region of a stress-strain relationship plot in which the strain is directly proportional to the applied stress. Within this limit, a material under stress will retract and recover its original dimension due to elastic contraction when the applied stress is removed.

The belt may comprise any suitable inorganic material, organic material or combinations of inorganic and organic materials that are flexible and stretchable. The belt may comprise one or more layers of any suitable flexible and stretchable thermoplastic film forming polymer, thermosetting film forming polymer, metal, or the like. Typical thermoplastic film forming polymers include polyethylene, terephthalate polymers, polycarbonates, polysulfone, polyacrylates, polyarylates, polyvinylidene fluoride, polyvinyl chloride, polystyrene, and the like. Typical thermosetting polymers include rubbers, cross-linked polyurethanes, phenolic resins, epoxy resins, vulcanized rubbers, cross-linked silicones, and the like. Typical metals include nickel, selenium, chromium, zirconium, titanium, gold, copper, and the like. The exposed surfaces of belts to be mounted on a rigid cylindrical support drum for use in fusing thermoplastic electrostatographic toner images preferably comprise well known flexible and stretchable adhesive material. Typical abhesive materials include polymers such as fluorocarbon polymers, polysiloxanes, waxy polyethylene, waxy polypropylene, and the like.

For electrostatographic imaging belts having a seam, the outer circumference of the belt after mounting and contracting on a rigid cylindrical drum, for imaging applications, is preferably at least about as long as the width of the receiving member to which a toner image is transferred to ensure that the entire receiving member surface can be imaged with transferred toner material. Belts having a seam are usually formed by welding the overlapped ends of a cut sheet with the welded seam extending from one edge to the opposite edge of the imaging belt in a direction parallel to the axis of the belt. Preferably, the outer circumference of a seamed belt is at least about 22 centimeters in order to provide adequate surface area to accommodate the width of a conventional size toner image receiving member [i.e., a standard size 8.5 inch (22 cm)×11.5 inch (29 cm) paper] as well as to permit facile mounting of the belt onto a rigid drum. However, for electrophotographic imaging machines dedicated to forming images on envelopes, calling cards and the like, the outer circumference of the seamed belt should have a surface area at least sufficient for positioning conventional processing stations such as a cleaning blade, a charging device, a development station, an erase lamp, and the like around the belt assembly.

There is no apparent maximum limit to the circumference of the inner surface of the belt. However, with larger circumferences, handling of the belt during the circumferential stretching and mounting steps may become somewhat difficult for a single worker. Normally, there is considerable latitude as to the circumferential dimension of the belt selected. Typically, for electrostatographic imaging applications, the circumference of the belt is slightly greater than about 22 cm (8.5 inches) to accommodate imaging on common receiving member surfaces. Typical circumferences for a seamed electrostatographic imaging belt are between about 22 cm and about 130 cm. A preferred range is between about 23 cm and about 110 cm. Optimum results are achieved with a range between about 45 cm and about 90 cm. If the belt is seamless, the inner circumference of electrostatographic imaging belts can be very small because there is no seam to disrupt the images being transferred to the receiving member, e.g. a standard letter size sheet. From a theoretical point of view, the inner circumference of the belt could be as small as the height of images in two adjacent lines plus the space between the lines. This allows formation of the images in one line while developed images from the other line are being transferred. In more practical applications, a satisfactory inner circumferential dimension for a seamless electrostatographic imaging belt is at least about 8 cm. When the inner circumference is less than about 8 cm, the free space available may not be sufficient for positioning all subsystems such as a cleaning blade, charging device, development station erase lamp (in the case of electrophotography) and the like around the belt/drum combination or the mechanical rigidity and strength of the thin drum wall may not be sufficient to resist the compression pressure exerted by the belt after mounting. Also, bending of a small circumference drum may occur when supported at each end in an imaging machine. Thus, the inner circumference of the belt is preferably at least about 10 cm. Optimum results are achieved with a belt having an inner circumference of at least about 12 cm.

Any suitable belt thickness may be utilized so long as a radial compression pressure of at least about 0.1 psi (7 gms/cm$^2$) in a radial direction onto the outer surface of the support drum can be achieved at the inner surface of the belt after it has been mounted on the rigid cylindrical support drum and the fluid pressure has been released. In embodiments where the belt is "keyed" to the drum, such as the embodiment illustrated in FIG. 28, a radial compression pressure as low about 0.1 psi (7 gms/cm$^2$) in a radial direction is sufficient to prevent the key from riding out of the groove. Adequate compression pressure is important to prevent the mounted belt from slipping on the rigid cylindrical support drum during use. Slippage of the belt on the rigid cylindrical support drum renders the cylindrical device unsuitable for electrostatographic imaging members, fuser rolls, drive rollers, and the like. More specifically, slippage can adversely affect registration of images in electrostatographic imaging processes, particularly where multiple images must be precisely registered with each other such as in demanding color imaging applications. Also, when welded belt seams encounter slippage, undesirable sophisticated detection systems would be required to ensure that images are not formed on the seam when the seam shifts due to slippage. Typical belt thicknesses fall with the range of between about 25 micrometers and about 250 micrometers. A preferred thickness is between about 50 micrometers and about 200 micrometers. An optimum belt thickness is between about 75 micrometers and about 130 micrometers based on flexibility, ease of belt handling, and cost considerations.

The electrostatographic imaging belt may comprise only a single imaging layer if the imaging layer is sufficiently flexible and self supporting and can achieve the desired compressive pressure of at least about 0.1 psi (7 gms/cm$^2$) in a radial direction onto the outer surface of the rigid cylindrical support drum after it has been mounted on the drum. Electrostatographic flexible belt imaging members are well known in the art. Typically, a flexible substrate is employed having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto an adhesive layer, if present, or directly over the blocking layer, and a charge transport layer is subsequently formed on the charge generation layer. For ionographic imaging members, an electrically insulating dielectric imaging layer is applied to the electrically conductive surface. The substrate may carry an optional anti-curl back coating on the side opposite from the side bearing the charge transport layer or dielectric imaging layer.

The belt substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, polysulfones, and the like which are flexible as thin webs. The electrically insulating or conductive substrate should be flexible and in the form of an endless flexible belt. Preferably, the endless flexible belt shaped substrate comprises a commercially available biaxially oriented polyester known as Mylar, available from E. I. du Pont de Nemours & Co. or Melinex available from ICI Americas, Inc. or Hostaphan, available from American Hoechst Corporation.

The thickness of the substrate layer depends on numerous factors, including beam strength and economical considerations, and thus this layer for a flexible belt may be of substantial thickness, for example, about 175 micrometers, or of minimum thickness less than 50 micrometers, provided there are no adverse effects on the final electrostatographic device.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. The conductive layer need not be limited to metals. Other examples of conductive layers may be combinations of materials such as conductive indium tin oxide as a transparent layer for light having a wavelength between about 4000 Angstroms and about 7000 Angstroms or a transparent copper iodide (CuII or a conductive carbon black dispersed in a plastic binder as an opaque conductive layer. A typical electrical conductivity for conductive layers for electrophotographic imaging members in slow speed copiers is about $10^2$ to $10^3$ ohms/square.

After formation of an electrically conductive surface, a charge blocking layer may be applied thereto to photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds as disclosed, for example, in U.S. Pat. Nos. 4,291,110, 4,338, 387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The blocking layer should be continuous and have a thickness of less than about 0.2 micrometer because greater thicknesses may lead to undesirably high residual voltage.

An optional adhesive layer may be applied to the blocking layer. Any suitable adhesive layer well known in the art may be utilized. Typical adhesive layer materials include, for example, polyesters, dupont 49,000 (available from E. L. dupont de Nemours and Company), Vitel PE-100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms).

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones, dibromo anthanthrone pigments, benzimidazole perylene, substituted 2,4-diamino-triazines disclosed in U.S. Pat. No. 3,442,781, polynuclear aromatic quirtones, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415, 639, the entire disclosure of this patent being incorporated herein by reference. Other suitable photogenerating materials known in the art may also be utilized, if desired.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamide imides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, allcyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of between about 0.1 micrometer and about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer.

The charge transport layer forming mixture preferably comprises an aromatic amine compound. Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl)phenylmethane; 4'-4"-bis(diethylamino)-2',2"-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive thermoplastic resin binder soluble in methylene chloride or other suitable solvent may be employed in the process of this invention to form the thermoplastic polymer matrix of the imaging member. Typical inactive resin binders soluble in methylene chloride include polycarbonate resin, polyvinylcarbazole, polyester, polyarylate, polyacrylate, polyether, polysulfone, polystyrene, and the like. Molecular weights can vary from about 20,000 to about 150,000. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

Generally, the thickness of the charge transport layer is between about 10 to about 50 micrometers, but thicknesses outside this range can also be used. The charge transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the charge transport layer to the charge generator layer is preferably maintained from about 2:1 to 200:1 and in some instances as great as 400:1.

Any suitable and conventional technique may be utilized to mix and thereafter apply the various layer coating mixtures. Typical application techniques include spraying, dip coating, roll coating, wire wound rod coating, and the like. Drying of the deposited coating may be effected by any suitable conventional technique such as oven drying, infra red radiation drying. air drying and the like.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise various configurations, for example, a charge generator layer sandwiched between a conductive surface and a charge transport layer as described above or a charge transport layer sandwiched between a conductive surface and a charge generator layer.

If desired, a charge transport layer may comprise electrically active resin materials instead of or mixtures of inactive resin materials with activating compounds. Electrically active resin materials are well known in the art. Typical electrically active resin materials include, for example, polymeric arylamine compounds and related polymers described in U.S. Pat. Nos. 4,801,517, 4,806,444, 4,818,650, 4,806,443 and 5,030,532. Polyvinylcarbazole and derivatives of Lewis acids described in U.S. Pat. No. 4,302,521. Electrically active polymers also include polysiiylenes such as described in U.S. Pat. No. 3,972,717. Other polymeric transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl) butadiene, polymers such as alkyl, nitro, amino, halogen, and hydroxy substitute polymers such as poly-3-amino carbazole, 1,3-dibromo-poly-N-vinyl carbazole and 3,6-dibromo-poly-N-vinyl carbazole and numerous other transparent organic polymeric transport materials as described in U.S. Pat. No. 3,870,516. The disclosures of each of the patents identified above pertaining to binders having charge transport capabilities are incorporated herein by reference in their entirety.

Other layers such as a conventional electrically conductive ground strip may be utilized along one edge of the belt in contact with the conductive layer, blocking layer, adhesive layer or charge generating layer to facilitate connection of the electrically conductive layer of the electrostatographic imaging member to ground or to an electrical bias through typical contact means such as a conductive brush, conductive leaf spring, and the like. Ground strips are well known and usually comprise conductive particles dispersed in a film forming binder. If the rigid cylindrical support drum is electrically conductive, e.g. is metallic, the ground strip may be electrically connected to the drum by various means such as a stripe of any suitable electrically conductive glue or paint which extends from the ground strip located on the outwardly facing edge of the belt around to the back of the belt. The electrically conductive rigid cylindrical drum would, of course, function as a path through the drum support shaft to ground or to an electrical bias source. Typical electrically conductive glues or paints comprise a film forming binder such as an epoxy or polyester resin highly loaded with dispersed electrically conductive particles such as silver powder. Alternatively, any suitable electrically conductive adhesive tape such as an aluminum tape may be utilized to connect the ground strip to the conductive support drum. One end of the tape can be attached to the ground strip and the other end can be attached to the drum or to the rear surface of the belt. Electrically conductive adhesive tapes are available commercially, e.g. No. 3142 available from Richards, Parents and Murray, Inc. In another embodiment, a small segment of the ground strip can be removed to expose the underlying conductive surface of the drum. An electrically conductive tape, paint or other suitable means may then be employed to connect the exposed conductive surface of the drum to the adjacent ground strip. In still another embodiment, a portion of the ground strip may be slit to allow folding of part of the ground strip so that the ground strip on the folded portion faces and is in direct electrical contact with the drum surface. It is preferred that these connectors not be applied to imaging areas of the electrostatographic imaging belt where they could interfere with imaging, cleaning, transfer or the like. No grounding strip is needed in connection with electrically conductive rigid cylindrical support drums if an electrostatographic imaging member belt comprises only a charge generating layer and charge transport layer, or only a dielectric imaging layer, or if the belt comprises an electrically conductive flexible substrate such as nickel or steel which is in direct contact with the electrically conductive support drum.

Optionally, an overcoat layer may also be utilized to protect the charge transport layer and improve resistance to abrasion. In some cases an anti-curl back coating may be applied to the rear side of the substrate to provide flatness and/or abrasion resistance. These overcoating and anticurl back coating layers are well known in the art and may comprise thermoplastic organic polymers or inorganic polymers that are electrically insulating or slightly semiconductive. Overcoatings are continuous and generally have a thickness of less than about 10 micrometers. The thickness of anti-curl backing layers should be sufficient to substantially balance the total curling forces of the imaging layer or layers on the opposite side of the supporting substrate layer.

Other typical electrophotographic imaging belts comprise a flexible electroformed nickel substrate, an adhesive layer and a vacuum deposited selenium alloy layer such as disclosed in U.S. Pat. No. 3,713,821, the entire disclosure thereof being incorporated herein by reference.

For electrographic imaging members, a flexible dielectric layer overlying the conductive layer may be substituted for the active photoconductive layers. Any suitable, conventional, flexible, stretchable, electrically insulating, thermoplastic dielectric polymer matrix material may be used in the dielectric layer of the electrographic imaging member. Typical electrographic imaging members are described in U.S. Pat. No. 5,073,434, the entire disclosure thereof being incorporated herein by reference.

For fuser rolls, the belt is normally an abhesive polymer that is flexible and stretchable. Typical abhesive polymers include tetrafluoroethylene, polysiloxane, fluorinated polyethylene (e.g., Vitons), waxy polyethylene, waxy polypropylene, and the like such as disclosed in U.S. Pat. Nos. 4,196,256 and 5,049,444, the entire disclosures thereof being incorporated herein by reference.

Any suitable rigid cylindrical support drum may be utilized. Preferably, the drum is rigid. The drum may comprise any suitable inorganic material, organic material, or a combination of inorganic and organic materials. Typical inorganic drums comprise, for example, a metal such as aluminum. Typical organic drums comprise a thermoplastic resin or thermosetting resins. The resulting resin drum may contain a filler or fillers if desired. The region of the outer surface of the rigid cylindrical support drum underlying the belt should be substantially free of any irregularities which would distort the imaging surface of the electrostatographic imaging belt and adversely affect the quality of toner images formed on the imaging surface. Thus, for example, the particle size of any fillers used in a resin drum should sufficiently small so that the fillers do not project so far above the outer average surface of the drum that it adversely affects the quality of toner images formed on the imaging surface. The structural strength of the support drum should be sufficient to permit the drum to remain rigid and resist deformation during and after mounting of the belt onto the drum. In other words, the structural strength should be sufficient to prevent thin walled support drums from buckling under the compression pressure exerted by the belt after belt mounting or bending when the belt/drum assembly is supported only at its ends in an imaging device.

The circumference size selected for the rigid cylindrical support drum depends upon the arc distant of the imaging surface of the belt. Thus, if a welded belt is utilized and the minimum size of the receiving member to be imaged is 8.5 inches (21.6 cm), the outer circumference of the rigid cylindrical support member should be at least about 22 cm. For a seamless belt, the outer circumference should be at least about 8 cm. The length of the supporting rigid cylinder may be slightly less, the same as, or slightly greater than the width of the belt. However, it is preferred that the surface of the drum underlies at least the imaging areas of the belt.

The rigid cylindrical support drum may be fitted with apertures on the outer periphery of the drum at one end of the drum, to introduce channeled streams of fluid under pressure into the region between the belt and the outer surface of the rigid cylindrical support drum to facilitate stretching of the belt during mounting of the belt onto the drum. Alternatively, an adjacent auxiliary mounting cylinder or ring may be utilized as a source of compressed fluid to stretch the belt during mounting of the belt onto the supporting cylindrical substrate. The size and number of apertures to be utilized in either the rigid cylindrical support drum substrate or in the auxiliary mounting drum or ring for stretching of the belt during the belt mounting process should be sufficient to achieve an equilibrium fluid pressure and the between the outer surface of the drum and the inner surface of the belt. Satisfactory results may be achieved when the equilibrium pressure of the fluid is between about 28.2 gms/cm$^2$ (0.4 psi) and about 352 gms/cm$^2$ (5 psi). Preferably, the equilibrium fluid pressure is between about 49.3 gms/cm$^2$ (0.7 psi) and about 282 gms/cm$^2$ (4 psi). Optimum results are achieved when the equilibrium pressure is between about 70.4 gms/cm$^2$ (1 psi) and about 246.3 gms/cm$^2$ (3.5 psi). For an imaging belt having a thickness of about 120 micrometers and a Young's Modulus of about $3.52 \times 10^7$ gms/cm$^2$ ($5.0 \times 10^5$ psi), the equilibrium fluid pressure required should be sufficient to stretch the circumferential dimension of the belt to an expanded circumferential dimension of at least about 0.1 percent greater than the outer circumference of the rigid cylindrical support drum but less than the elastic limit of the belt. The amount of equilibrium fluid pressure desired depends upon how readily the belt stretches which, in turn, is determined by the thickness of the belt and its Young's Modulus.

Generally, the mounting of the belts onto a rigid cylindrical support drum is a accomplished at temperatures below the deformation temperature of all components of the preformed flexible belt. For example, the mounting should preferably be undertaken at temperatures below the glass transition temperature of an polymeric component of the preformed belt. This ensures that the preformed flexible belt has an inner circumference of at least about 0.05 percent smaller than the outer circumference of the drum to achieve the desired compression pressure of at least about 7 gms/cm$^2$ (0.1 psi) at the inner surface of the belt in a radial direction onto the outer surface of the support drum after the belt has been mounted on the support drum and the fluid pressure has been released. This ensures that the frictional force between the belt and the rigid cylindrical support drum is sufficient to overcome the tangential force arising from mechanical interaction forces while the mounted belt is being used in a machine. Embodiments of the belt/drum of the present invention are illustrated in Working Examples 1 through V and the calculations for determining compression pressure are in Working Example V below.

Any suitable aperture shape may be utilized. Typical aperture shapes include round, oval, square, triangular, slotted, rhombic, rectangular, trapezoidal, and the like and combinations thereof. Generally, the apertures are positioned adjacent to the belt mounting end of the rigid cylindrical support drum. Thus, the apertures may be formed in the rigid cylindrical support drum itself or in an adjacent auxiliary mounting cylinder or mounting ring (essentially a shortened mounting cylinder), if an auxiliary mounting cylinder or mounting ring is utilized for belt transport. Moreover, where a mounting ring or mounting cylinder is employed, apertures may be employed in both the rigid cylindrical support drum and in the mounting ring or cylinder. In addition, one or more rows of apertures may be used in the rigid supporting drum and/or mounting ring or mounting cylinder. Any suitable number of apertures may be utilized around the periphery of the rigid supporting drum, mounting ring or mounting cylinder. Generally sufficient apertures should be utilized to achieve the desired equilibrium pressure for stretching of the belt. Generally, large diameter apertures are less desirable because large dimples can form on the outer surface of the belt after the fluid pressure has been removed and the belt has been allowed to shrink against the rigid supporting substrate. When an end of the rigid cylindrical support drum contains a plurality of circumferentially located apertures and an edge of an imaging belt overlies the apertures, the apertures should preferably not be under the region of the belt that will be used for imaging because the underlying apertures can cause distortion of the imaging surface of the belt.

Any suitable fluid may be utilized to stretch the belt. Typical fluids include air, nitrogen, carbon dioxide, argon, helium, fluorocarbon, chlorofluorocarbon, water, alcohol, and the like. Air is preferred because it is inexpensive, non-toxic and leaves no residual debris. The fluid may be compressible or non-compressible. Generally, the fluid is supplied to manifolds which feed the fluid to the apertures. Generally, the interior volume of the manifolds is small to minimize the volume of fluid required and to maximize the effect of belt stretching speed. Any suitable means may be utilized to regulate the pressure supplied to the inner manifolds. Typical regulating means include, for example, conventional pressure regulator valves.

The fluid may be supplied from any suitable source such as a storage tank, electrical or mechanical compressor, a turbo compressor, pressurized cylinder and the like. Although a pulsating of fluid may be utilized, the fluid source supplying fluid under conventionally uniform pressure is preferred. Although a variety of compressed gases and liquids have been identified above, however, gases such as air and nitrogen are generally the preferred fluids from cost and ease of handling considerations.

If desired, the rigid cylindrical support drum may be fitted with several means at the end of the drum opposite the mounting end to stop the belt as it is slid onto the drum. Any suitable belt stopping means may be utilized such as pegs, tape, ridge, pins, and the like.

Thus, the imaging members of this invention achieve more precise tolerances, can be readily recycled, are less expensive, extend the cycling life of belts and the like. By rendering a portion of a flexible belt thinner than the rest of the belt or inserting a lower modulus and highly elastic strip of material to link the two ends of the major imaging member segment to form the belt of the present invention, all significant stretching can therefore be confined to a preselected area of the belt to avoid distortion or damage in the functional layers of the belt. In other words a photoreceptor is provided which will only stretch in limited non-imaging portion (or portions) of the belt, thereby eliminating or minimizing the disadvantages associated with the present state of art.

The invention will now be described in detail with respect to specific preferred embodiments thereof, it being noted that these examples are intended to be illustrative only and are not intended to limit the scope of the present invention. Parts and percentages are by weight unless otherwise indicated.

EXAMPLE I

A photoconductive imaging member web was prepared by providing a titanium coated polyester substrate having a thickness of 76.2 micrometers (3 mils) and applying thereto, using a gravure applicator, a solution containing 50 gms 3-aminopropyltriethoxysilane, 50.2 gms distilled water, 15 gms acetic acid, 684.8 gms of 200 proof denatured alcohol and 200 gms heptane. This layer was then allowed to dry for 5 minutes at 135° C. in a forced air oven. The resulting blocking layer had a dry thickness of 0.05 micrometer.

An adhesive interface layer was then prepared by applying with a gravure applicator to the blocking layer a wet coating containing 5 percent by weight based on the total weight of the solution of polyester adhesive (DuPont 49,000, available for E. I. du Pont de Nemours & Co.) in a 70:30 volume ratio mixture of tetrahydrofuran/cyclohexanone. The adhesive interface layer was allowed to dry for 5 minutes at 135° C. in a forced air oven. The resulting adhesive interface layer had a dry thickness of 0.07 micrometer.

The adhesive interface layer was thereafter coated with a photogenerating layer containing 7.5 percent by volume trigonal Se, 25 percent by volume N,N'-diphenyl-N,N'-bis (3-methylphenyl)-1,1'-biphenyl-4,4'-diamine, and 67.5 percent by volume polyvinylcarbazole. This photogenerating layer was prepared by introducing 8 gms polyvinyl carbazole and 140 mls of a 1:1 volume ratio of a mixture of tetrahydrofuran and toluene into a 20 oz. amber bottle. To this solution was added 8 gram of trigonal selenium and 1,000 gms of ⅛ inch (3.2 millimeter) diameter stainless steel shot. This mixture was then placed on a ball mill for 72 to 96 hours. Subsequently, 50 gms of the resulting slurry were added to a solution of 3.6 gm of polyvinyl carbazole and 2.0 gm of N,N'-diphenyl-N,N'-bis(3-methylphenyl)-1,1'-biphenyl-4,4'-diamine dissolved in 75 ml of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the substrate, blocking layer and adhesive layer was deliberately left uncoated by any of the photogenerating layer material to facilitate adequate electrical contact by the ground strip layer that is applied later. This photogenerating layer was dried at 135° C. for 5 minutes in a forced air oven to form a dry thickness photogenerating layer having a thickness of 2.0 microns.

This coated imaging member web was simultaneously overcoated with a charge transport layer and a ground strip layer by coextrusion of the coating materials. The charge transport layer was prepared by introducing into an amber glass bottle in a weight ratio of 1:1 N,N'-diphenyl-N,N'-bis (3-methylphenyl)-1,1'-biphenyl-4,4'-diamine and Makrolon R, a polycarbonate resin having a molecular weight of from about 50,000 to 100,000. The resulting mixture was dissolved in 15 percent by weight methylene chloride. This solution was applied on the photogenerator layer by extrusion to form a coating which upon drying had a thickness of 24 micrometers.

The strip about 3 mm wide of the adhesive layer left uncoated by the photogenerator layer was coated with a ground strip layer during the coextrusion process. The ground strip layer coating mixture was prepared by combining 23.81 gms. of polycarbonate resin, and 332 gms of methylene chloride in a carboy container. The container was covered tightly and placed on a roll mill for about 24 hours until the polycarbonate was dissolved in the methylene chloride. The resulting solution was mixed for 15–30 minutes with about 93.89 gms. of a graphite dispersion (12.3 Percent by weight solids) of 9.41 parts by weight graphite, 2.87 parts by weight ethyl cellulose and 87.7 parts by weight solvent with the aid of a high shear blade disperser. The resulting dispersion was then filtered and the viscosity was adjusted with the aid of methylene chloride. This ground strip layer coating mixture was then applied to the photoconductive imaging member to a form an electrically conductive ground strip layer having a dried thickness of about 14 micrometers. This ground strip may be electrically grounded by conventional means such as a carbon brush contact means.

The resulting imaging member web containing all of the above layers was annealed at 135° C. in a forced air oven for 5 minutes.

An anti-curl coating was prepared by combining 88.2 gms of polycarbonate resin, 0.9 gm of polyester resin (Vitel PE-100, available from Goodyear Tire and Rubber Company) and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear disperser to form the anti-curl coating solution. The anti-curl coating solution was then applied to the rear surface (side opposite the photogenerator layer and charge transport layer) of the photoconductive imaging member web by extrusion coating and dried at 135° C. for about 5 minutes in a forced air oven to produce a dried film having a thickness of 13.5 micrometers.

EXAMPLE II

The surface contact friction of the anti-curl coating of the photoconductive imaging member of Example I was evaluated against a smooth aluminum surface to simulate the imaging member belt/aluminum drum frictional interaction as the belt was mounted onto a rigid aluminum drum to form the desired belt/drum imaging system configuration.

The coefficient of friction test was conducted by fastening the photoconductive imaging member to be tested to the flat bottom surface of a horizontally sliding 200 gm weight plate, using a double sided adhesive tape, with the outer surface of the anti-curl layer facing downwardly. The weight plate bearing the anti-curl layer was dragged in a straight line against a smooth flat horizontal aluminum test surface. The weight plate was moved by a cable which had one end fastened to the weight and the other end threaded around a low friction pulley. The pulley was positioned so that the segment of the cable between the weight and the pulley was parallel to the surface of the smooth flat horizontal aluminum test surface. The cable was pulled vertically upward from the pulley by an Instron Tensile Test Instrument. The load in gms required to pull the weight plate sliding over the aluminum surface was divided by 200 gms to give a coefficient of contact friction value of 0.22.

Example III

The photoconductive imaging member web of Example I, having a width of 414 mm, was cut to a precise 591 mm length to form a rectangular sheet. The opposite ends of this imaging member sheet were overlapped 1 mm and joined by ultrasonic energy seam welding using a 40 KHz horn to form a belt having an inner circumferential dimension of 590 mm. This imaging belt was prepared to achieve an inner circumferential dimension about 0.5 percent smaller than the outer circumferential dimension of a rigid aluminum support drum. The belt was mounted onto the drum to serve as a belt/drum imaging system of this invention similar to that shown in FIG. 9. This mounting was successfully demonstrated by employing a pneumatic mounting technique using a compressed air source to provide an equilibrium air pressure of 281.2 gms per square centimeter (4.0 psi) to substantially expand the belt and enable belt mounting. The rigid aluminum support drum had an outer circumferential dimension of 59.3 cm and an axial length of 41.4 cm. The end of the drum onto which the belt was slid carried 8 round holes evenly spaced around the periphery, the center of the holes being 3 mm from the end of the drum upon which the belt was slid. Each of the holes had a diameter of 2 millimeters. The opposite ends of the drum were sealed with covers. The cover farthest from the holes carried an air feed fitting to which a hose was attached. Compressed air was fed into the drum through the hose from a compressed air source with the air pressure being controlled by a pressure regulator. When the edges of the mounted belt were aligned with each end of the drum, the supply of the compressed air was terminated and the belt collapsed instantly to encircle and hug the drum.

Under the 0.5 percent wrap around strain, the imaging belt would (according to FIG. 25) produce a 1,932 gms per centimeter (10.81 lbs/in axial drum length) tension to cause the belt to tightly hug the rigid support drum. Since the aluminum support drum had a Young's modulus of $72.43 \times 10^7$ gms per square centimeter ($10:3 \times 10^5$ lbs/in$^2$), it is 21 times greater than the Young's modulus of $3.446 \times 10^7$ gms per square centimeter ($4.9 \times 10^5$ lbs/in$^2$), of the imaging belt. Furthermore, the support drum had a wall thickness of at least 100 times greater than the thickness of the imaging belt. Therefore, the rigid aluminum support drum was virtually incompressible under the pressure exerted by the belt and exhibited no dimensional changes as a result of the radial compression force arising after imaging belt mounting.

EXAMPLE IV

To understand the mechanical interaction between an imaging member belt and a rigid drum support onto which the belt would be mounted, the stress-relaxation characteristic of the imaging belt, at a constant 0.5 percent strain, as a function of time after belt mounting over the rigid drum was investigated. Simulation of the effect of the constantly imposed 0.5 percent belt strain on stress response at the imaging belt/rigid drum interface was carried out by cutting two 1.27 cm (½ in) wide by 10.16 cm (4 in) long test samples of the imaging member described in Example I for stress-relaxation measurements, one test sample at 25° C. and the other at an elevated temperature of 50° C. The 25° C. measurement was intended to capture the stress-relaxation effect during the machine off period, whereas the elevated temperature testing at 50° C. was intended to duplicate the conditions during the time that the imaging belt/drum system of the present invention was in a machine operating mode.

Prior to stress-relaxation evaluation, both test samples were first subjected to an ultraviolet excimer laser ablation process to precisely remove a 2.54 cm (one inch) width of anti-curl coating and part of the polyester substrate from the back and mid section of each test sample, thereby creating a thin narrow minor segment having exactly 49 percent of its original sample thickness similar to that shown in FIG. 27. Since the thin narrow minor segment would concentrate more stress and be stretched to a greater extent than the remaining part (the major segment) of the imaging belt, the 2.54 cm width thin narrow minor segment would be mechanically stretched to an elongation of 1.062 percent constant strain to emulate the effect of an imposed 0.5 percent belt strain based on a 591 mm (23.2283 inches)inner circumferential dimension of the imaging belt.

The first test sample was evaluated for stress-relaxation behavior with respect to time by first inserting the test sample into the upper and the lower jaws of an Instron mechanical tester, leaving a 5.08 cm (2 in) sample gage length with the (one inch) width thin narrow minor segment positioned midway between the upper and lower jaws. Next, under a controlled room ambient temperature of 25° C., the test sample was stretched to an instantaneous 1.062 percent strain with respect to the 2.54 cm width thin narrow minor segment in the test sample. The change in tension response at the constant imposed 1.062 percent sample strain was monitored for 96 hours with a chart recorder. The stress-relaxation measurement was repeated again by following the procedures described above for the second test sample, except that the testing was carried out under the elevated temperature of 50° C. To achieve and maintain this temperature condition, the Instron jaws with the test sample were enclosed in a temperature controlled chamber for the entire duration of the stress-relaxation measurement of 48 hours.

EXAMPLE V

The results obtained from the stress-relaxation measurements, monitored and recorded as a force-time curve on chart paper of a recorder at each temperature condition of 25° C. and 50° C. described in Example IV, were introduced into the following mathematical model:

$$S_t = S_o \, EXP-(t/\tau)\beta$$

wherein:

$S_t$ was the imaging member belt tension response at time t.

$S_o$ was the initially imposed imaging member tension.

t was the cumulative time in hours that the imaging member was under tension.

$\tau$ was the characteristic relaxation time constant for the imaging member.

$\beta$ was a characteristic constant.

Since $S_o$ was the known instantaneous sample tension as soon as the 1.062 percent strain was imposed at the beginning of the test and unlimited values of the transient sample tension were generated using the recorded force-time curve, the constants $\tau$ and $\beta$ were conveniently calculated by using the $S_o$ and two values of $S_t$ in the mathematical model given above. Although small variations in $\tau$ and $\beta$ results were obtained for the different sets of $S_t$ used in the calculations, averaging of the values of these results gave the best representation for matching the stress-relaxation mathematical model with the experimental force-time curve. Both the $\tau$ and $\beta$ were, therefore, empirically obtained values. At ambient and elevated temperature conditions, $\tau$ and $\beta$ were:

For 25° C., $\tau$=9,978.7 hours $\beta$=0.3211

For 50° C., $\tau$=3,489.8 hours $\beta$=0.2314

Thus, since each polymer has its own $\tau$ and $\beta$ constants, the value of the $\tau$ and $\beta$ constants are determined for each different polymer.

Figure 32:
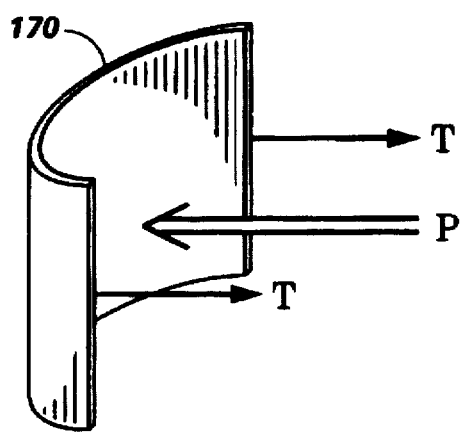
FIG. 32 is an isometric sectional view of an electrostatographic imaging belt being subjected to tension T and equilibrium pressure P.

Assuming that an imaging belt had an electrical service life of one year; with 4 months cumulative time under 50° C. and 8 months at 25° C. ambient condition, the tension stress which was still retained in the imaging belt after a year of stress-relaxation (calculated using the above mathematical model) was 30.4 percent. This corresponded to the decrease in belt tension from the original value of 1,932 gms/cm (10.81 lb/in) to 587 gms/cm (3.29 lb/in) at the end of the service life of the imaging belt. With this belt/drum combination, the system is analogous to the condition of a cylindrical pipe having a diameter D, a wall tension T, and an internal pressurized fluid at an equilibrium pressure P as illustrated in FIG. 32. Using a 2.54 cm (one inch) pipe length as a basis, the force balance under equilibrium conditions is:

$$P(D)(1 \text{ in})=2(T)(1 \text{ in})$$

Therefore, $$P=2T/D$$

where:

T is the wall tension in lbs/in and

D is the diameter of the pipe in inches.

In this case, T corresponds to the imaging belt tension, D corresponds to the diameter of the aluminum support drum, and P is the compression pressure exerted by the belt over the drum surface. Accordingly, the value of this belt tension after a year of service was calculated to yield a compression pressure of 62.3 gms/cm$^2$ (0.8856 psi) at the drum surface. Employing the frictional force equation:

$$F=\mu N$$

Where $\mu$, the coefficient of contact friction between the anti-curl coating of the imaging belt and the aluminum surface, was 0.22; and N, the normal force at the contacting surface (based on the 593 millimeter circumference surface of an aluminum support drum having a length of 2.54 cm) was equal to (0.885 lb/in$^2$) (23.2283 inches) (1 inch) or 20.68 lbs. Substituting the values of p and N to this frictional equation, it gave:

F=(0.22)(20.68 lbs)=4.55 lbs per inch axial drum length (or 812 gms per centimeter axial drum length)

Since this friction force was 36.3 times greater than the 22.3 gms/cm (0.125 lb per inch) width tangential force developed at the imaging member belt surface by cleaning blade and other mechanical subsystem interactions, the imaging belt/drum device of this invention ensures precision electrophotographic imaging performance under a service environment without encountering belt slippage.

EXAMPLE VI

The 1.27 cm (½ in) wide by 10.16 cm (4 in) long photoconductive imaging member test sample, having a 2.54 cm (one inch) wide thin narrow minor segment in the mid section of the sample was further evaluated for stretching induced imaging layer cracking after its completion of stress-relaxation measurement, at a controlled temperature of 25° C. and a corresponding thin narrow minor segment constant strain of 1.062 percent and a gage length of 5.08 cm (2 in), as described in Example V. The sample was removed from the Instron jaws and examined under 100× magnification using an optical transmission microscope for stretching induced imaging layer cracking.

Since no stretch induced imaging layer cracking was noted, the sample was inserted back into the Instron jaws for further incremental stretch testing. Although an increase to 1.25 percent strain did not cause the development of cracks in the imaging layers, the onset of charge generation layer cracking in the narrow minor segment was clearly evident when a higher strain of 1.5 percent was imposed on the test sample. In sharp contrast, no imaging layer cracking developed in the major segment adjacent to the thin narrow minor segment. This result indicates that the test imaging member sample elongation was largely focused in the thin narrow minor segment due to stress concentration as a result of cross-sectional area reduction. This stress confinement effectively relieves the strain from the major segment of the imaging member and minimizes the likelihood of cracks developing in the imaging layer of the major segment.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A method for fabricating a cylindrical device having at least one distinct outer layer comprising
    providing a preformed rigid cylindrical support drum having a predetermined outer circumference, a first end and a second end;
    providing a flexible belt having an outer surface and an inner surface circumference of at least about 0.05 percent smaller than said outer circumference of said drum, said belt comprising a major segment and at least one narrow minor segment, said narrow minor segment extending from one end of said belt to the opposite end and being more extendible than said major segment under the same externally applied tension;
    circumferentially expanding said belt with a flowing fluid under pressure until said inner surface circumference of said belt adjacent said drum is stretched to a new dimension of at least about 0.1 percent greater than said outer circumference of said support drum while maintaining said belt below the elastic limit of said belt;
    sliding said belt onto said support drum from said first end of said drum toward said second end of said drum; and terminating said flow of said flowing liquid to allow said belt to contract onto said outer surface of said drum to form said cylindrical device.

2. A method according to claim 1 wherein said narrow minor segment has a thickness less than the thickness of said major segment.

3. A method according to claim 2 wherein said narrow minor segment has an average thickness between about 40 percent and 70 percent of the thickness of said major segment.

4. A method according to claim 2 wherein said narrow minor segment has an average thickness between about 45 percent and about 60 percent of the thickness of said major segment.

5. A method according to claim 2 wherein said narrow minor segment has a width between about 1.2 cm and about 4 cm.

6. A method according to claim 5 wherein said narrow minor segment has a width between about 2 percent and about 7 percent of the circumferential dimension of said belt.

7. A method according to claim 1 wherein said narrow minor segment comprises a material different from that of said major segment.

8. A method according to claim 7 wherein said narrow minor segment has a Young's modulus of between about 30 percent and about 60 percent of the Young's modulus of said major segment and has an elasticity limit about equal to up to about 10 times the elasticity limit of said major segment.

9. A method according to claim 1 wherein said narrow minor segment has a thickness substantially the same as the thickness of said major segment.

10. A method according to claim 1 wherein said flexible belt is a welded belt having a seam extending extending from said one end of said belt to said opposite end.

11. A method according to claim 10 wherein said seam is located within said narrow minor segment.

12. A method according to claim 1 wherein said narrow minor segment comprises a depression in said inner surface of said belt and said depression in said inner surface of said belt is mated with a protrusion from said support drum.

13. A method according to claim 1 wherein said narrow minor segment comprises a depression in said outer surface of said belt.

14. A method according to claim 1 wherein said narrow minor segment comprises a depression in said inner surface of said belt and a depression in said outer surface of said belt.

15. A method according to claim 1 wherein said belt exerts a compressive pressure of at least about 7 grams/cm$^2$ in a radial direction onto said outer surface of said drum after said belt is allowed to contract by terminating said flow of said flowing liquid.

16. A method according to claim 1 wherein said belt is a seamless belt.

17. A method according to claim 1 wherein said belt is an electrostatographic imaging member.

18. A method according to claim 16 wherein said belt is an electrographic imaging member comprising a flexible substrate and a dielectric imaging layer.

19. A method according to claim 16 wherein said belt is an electrophotographic imaging member comprising a flexible support layer, a charge generating layer and a charge transport layer.

20. A method according to claim 1 wherein said narrow minor segment contains a plurality of holes.

* * * * *